US010733832B2

(12) United States Patent
Meyer et al.

(10) Patent No.: US 10,733,832 B2
(45) Date of Patent: Aug. 4, 2020

(54) METHOD OF GAMING, A GAMING SYSTEM AND A GAME CONTROLLER

(71) Applicant: Aristocrat Technologies Australia Pty Limited, North Ryde, NSW (AU)

(72) Inventors: Jason Meyer, Wyoming (AU); Liam Sanders, Leichhardt (AU); Matthew Chan, East Killara (AU); Amy Batsiokis, Ryde (AU)

(73) Assignee: ARISTOCRAT TECHNOLOGIES AUSTRALIA PTY LIMITED, North Ryde, NSW (AU)

( * ) Notice: Subject to any disclaimer, the term of this patent is extended or adjusted under 35 U.S.C. 154(b) by 0 days.

(21) Appl. No.: 15/694,959

(22) Filed: Sep. 4, 2017

(65) Prior Publication Data

US 2019/0073857 A1 Mar. 7, 2019

(51) Int. Cl.

| | |
|---|---|
| ***A63F 9/24*** | (2006.01) |
| ***A63F 13/00*** | (2014.01) |
| ***G06F 17/00*** | (2019.01) |
| ***G07F 17/32*** | (2006.01) |
| ***G07F 17/34*** | (2006.01) |

(52) U.S. Cl.

CPC ...... *G07F 17/3213* (2013.01); *G07F 17/3209* (2013.01); *G07F 17/3225* (2013.01); *G07F 17/3246* (2013.01); *G07F 17/3251* (2013.01); *G07F 17/34* (2013.01)

(58) Field of Classification Search

CPC ......................... G07F 17/3244; G07F 17/3202

See application file for complete search history.

(56) References Cited

U.S. PATENT DOCUMENTS

| | | | |
|---|---|---|---|
| D341,848 S | 11/1993 | Bigelow et al. | |
| 5,584,764 A | 12/1996 | Inoue | |
| 5,927,714 A | 7/1999 | Kaplan | |

(Continued)

FOREIGN PATENT DOCUMENTS

| | | |
|---|---|---|
| GB | 191402539 | 4/1914 |
| GB | 191402539 A | 4/1914 |

(Continued)

OTHER PUBLICATIONS

Notice of Allowance and Fee(s) Due, dated Sep. 24, 2018, for U.S. Appl. No. 29/616,091, filed Sep. 1, 2017.

(Continued)

*Primary Examiner* — Kang Hu
*Assistant Examiner* — Jason Pinheiro
(74) *Attorney, Agent, or Firm* — McAndrews, Held & Malloy, Ltd.

(57) ABSTRACT

A gaming machine having a display to display symbols at a plurality of display positions and a plurality of prize identifiers. The gaming machine also includes a game controller to cause a display to display a plurality of symbols at the display positions and visually moves a number of a plurality of prize identifiers at a first speed. If a trigger condition occurs with the displayed symbols, the game controller selects a prize identifier of the prize identifiers to be upgraded while visually moving the selected prize identifier being upgraded at a second speed onto the display. The game controller completes the upgrading on the display while the selected prize identifier is being displayed.

27 Claims, 16 Drawing Sheets

(56) References Cited

U.S. PATENT DOCUMENTS

| | | | | |
|---|---|---|---|---|
| D470,857 | S | 2/2003 | Anderson et al. | |
| D479,243 | S | 9/2003 | Ohashi et al. | |
| D562,338 | S | 2/2008 | Keohane | |
| 7,381,134 | B2 * | 6/2008 | Cuddy | G07F 17/32 463/16 |
| 7,785,190 | B2 | 8/2010 | Aida | |
| D633,921 | S | 3/2011 | Brinda | |
| D677,326 | S | 3/2013 | Gleasman et al. | |
| D695,781 | S | 12/2013 | Edwards et al. | |
| 8,651,940 | B2 | 2/2014 | Loat et al. | |
| D749,108 | S | 2/2016 | Bauer et al. | |
| D772,240 | S | 11/2016 | Edstrom et al. | |
| D772,273 | S | 11/2016 | Spector | |
| D772,888 | S | 11/2016 | Jon et al. | |
| D772,920 | S | 11/2016 | Bauer | |
| D785,664 | S | 5/2017 | Yao et al. | |
| D786,271 | S | 5/2017 | Randon | |
| D791,802 | S | 7/2017 | Solop et al. | |
| D793,409 | S | 8/2017 | Berman et al. | |
| D797,764 | S | 9/2017 | Bouroullec et al. | |
| D819,042 | S | 5/2018 | Ebler et al. | |
| 2003/0094760 | A1 | 5/2003 | Motegi et al. | |
| 2004/0048645 | A1 * | 3/2004 | Webb | G07F 17/3202 463/16 |
| 2007/0167223 | A1 * | 7/2007 | Bleich | G07F 17/32 463/25 |
| 2007/0277105 | A1 | 11/2007 | Lee et al. | |
| 2007/0293299 | A1 | 12/2007 | Aida | |
| 2008/0113696 | A1 * | 5/2008 | Owen | G07F 17/32 463/1 |
| 2008/0274786 | A1 | 11/2008 | Wilson | |
| 2009/0124345 | A1 | 5/2009 | Gilmore et al. | |
| 2011/0053678 | A1 | 3/2011 | Aida | |
| 2011/0136562 | A1 | 6/2011 | Loat et al. | |
| 2015/0018070 | A1 | 1/2015 | Meyer | |
| 2015/0302685 | A1 * | 10/2015 | Carter | G07F 17/3262 463/20 |
| 2016/0093147 | A1 | 3/2016 | Penacho et al. | |
| 2016/0189471 | A1 | 6/2016 | Penacho et al. | |
| 2016/0217646 | A1 | 7/2016 | Hornik | |

FOREIGN PATENT DOCUMENTS

| | | | |
|---|---|---|---|
| GB | 191412274 | | 4/1920 |
| GB | 191412274 | A | 4/1920 |
| GB | 364177 | | 12/1931 |
| GB | 364177 | A | 12/1931 |
| GB | 2106682 | A | 4/1983 |
| GB | 2106682 | B | 12/1984 |
| JP | H01209089 | | 8/1989 |
| JP | H01209089 | A | 8/1989 |
| JP | H0639085 | | 2/1994 |
| JP | H0639085 | A | 2/1994 |
| JP | H06238033 | | 8/1994 |
| JP | H06238033 | A | 8/1994 |
| JP | H09234274 | | 9/1997 |
| JP | H09234274 | A | 9/1997 |
| JP | H11114138 | | 4/1999 |
| JP | H11114138 | A | 4/1999 |
| JP | 2920027 | | 7/1999 |
| JP | 2920027 | B2 | 7/1999 |
| JP | H11309238 | | 11/1999 |
| JP | H11309238 | A | 11/1999 |
| JP | 2000037501 | | 2/2000 |
| JP | 2000037501 | A | 2/2000 |
| JP | 2000102643 | | 4/2000 |
| JP | 2000102643 | A | 4/2000 |
| JP | 2001353257 | | 12/2001 |
| JP | 2001353257 | A | 12/2001 |
| JP | 2002165958 | | 6/2002 |
| JP | 2002165958 | A | 6/2002 |
| JP | 2003154047 | | 5/2003 |
| JP | 2003154047 | A | 5/2003 |
| JP | 3424032 | | 7/2003 |
| JP | 3424032 | B2 | 7/2003 |
| JP | 2003190385 | | 7/2003 |
| JP | 2003190385 | A | 7/2003 |
| JP | 2005046255 | | 2/2005 |
| JP | 2005046255 | A | 2/2005 |
| JP | 2005052193 | | 3/2005 |
| JP | 2005052193 | A | 3/2005 |
| JP | 2005052195 | | 3/2005 |
| JP | 2005052195 | A | 3/2005 |
| JP | 3811299 | | 8/2006 |
| JP | 3811299 | B2 | 8/2006 |
| JP | 2007061465 | | 3/2007 |
| JP | 2007061465 | A | 3/2007 |
| JP | 2008154672 | | 7/2008 |
| JP | 2008154672 | A | 7/2008 |
| JP | 2009112413 | | 5/2009 |
| JP | 2009112413 | A | 5/2009 |
| JP | 4436083 | | 3/2010 |
| JP | 4436083 | B2 | 3/2010 |
| JP | 4480126 | | 6/2010 |
| JP | 4480126 | B2 | 6/2010 |
| JP | 5137069 | | 2/2013 |
| JP | 5137069 | B2 | 2/2013 |

OTHER PUBLICATIONS

Office Action, dated Oct. 18, 2018, for U.S. Appl. No. 15/927,858, filed Mar. 21, 2018.

* cited by examiner

METHOD OF GAMING, A GAMING SYSTEM AND A GAME CONTROLLER

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND

In jackpot gaming machines, symbols are selected to present a prize level. The prize level is generally predetermined. The presentation of the prize level is also static. Therefore, a need exists for new gaming systems in order to increase player enjoyment.

BRIEF SUMMARY

An embodiment provides a gaming machine for use by a player to play a base game and a feature game. The gaming machine includes a credit input mechanism to receive a physical item representing a monetary value for establishing a credit balance. The credit balance is increasable and decreasable based at least on wagering activity. The gaming machine includes a display to present the base game and the feature game for viewing by the player. The base game has a plurality of different base game symbol outcomes. The feature game is triggerable by at least one of the base game symbol outcomes, and the feature game includes a plurality of vertical segments displayable on the display. Each of the vertical segments carries a number visible to the player. The vertical segments are movable laterally across the display, and the carried number of a vertical segment is increasable numerically in response to one of the base game symbol outcomes and visibly showing the increase to the player. One of the vertical segments is selectable to provide a prize having a value in accordance to the number carried by the selected segment. The gaming machine includes a payout mechanism to, in response to determining a prize is to be provided, increase the credit balance based on the prize, and to cause a payout associated with the credit balance.

Another embodiment provides a gaming machine for use by a player to play a base game and a feature game. The gaming machine includes a credit input mechanism to receive a physical item representing a monetary value for establishing a credit balance. The credit balance is increasable and decreasable based at least on wagering activity. The gaming machine also includes credit meters to monitor the credit balance, and a display including 1) a first display area to display symbols at a plurality of display positions, and 2) a second display area to display a plurality of segments, the segments carrying a plurality of prize identifiers. The gaming machine also includes a memory to store a plurality of symbols. The gaming machine also includes a game controller to, in accord with the established credit balance, visually move the segments at a first speed, select symbols from the memory for display, and to cause the display to display the selected symbols at the display positions, determine if the displayed symbols include a trigger condition, select one of the segments to be upgraded in response to determining that the displayed symbols include a trigger condition, visually move the display segments at a second speed to display the selected one of segments to be upgraded, and upgrade the prize identifier of the selected one of segments to be upgraded. The gaming machine also includes a payout mechanism to, in response to determining an award is to be provided, increase the credit balance based on the award, and to cause a payout associated with the credit balance.

Another embodiment provides a gaming machine for use by a player to play a base game and a feature game. The gaming machine includes a credit input mechanism to receive a physical item representing a monetary value for establishing a credit balance. The credit balance is increasable and decreasable based at least on wagering activity. The gaming machine also includes credit meters to monitor the credit balance, and a memory configured to store a plurality of symbols and a plurality of prize identifiers. The gaming machine also includes a display having a plurality of display positions and a plurality of prize segments, each prize segment displays a prize identifier. The gaming machine also includes a game controller to, in accord with the established credit balance, select symbols from the memory, cause the display to display the selected symbols at the display positions, visually move the prize segments on the display at a first speed, determine if the displayed symbols include a trigger condition, select one of the prize identifiers to upgrade in response to determining that the displayed symbols include a trigger condition, visually move the prize segments at a second speed on the display to display the selected one of prize identifiers to be upgraded, and visually complete the upgrade of the selected one of prize identifiers on the display while the selected one of the prize identifiers is being displayed. The gaming machine also includes a payout mechanism to, in response to determining an award is to be provided, increase the credit balance based on the award, and to cause a payout associated with the credit balance.

A system and/or method is provided for a pick to reveal jackpot game having randomly determined multipliers awarded for each of a plurality of prize levels, wherein one or more of the multipliers are presented at a display of a gaming machine in association with the corresponding one or more prize levels, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

BRIEF DESCRIPTION OF THE DRAWINGS

Embodiments of the invention will now be described with reference to the accompanying drawings in which.

DETAILED DESCRIPTION

Figure 1:
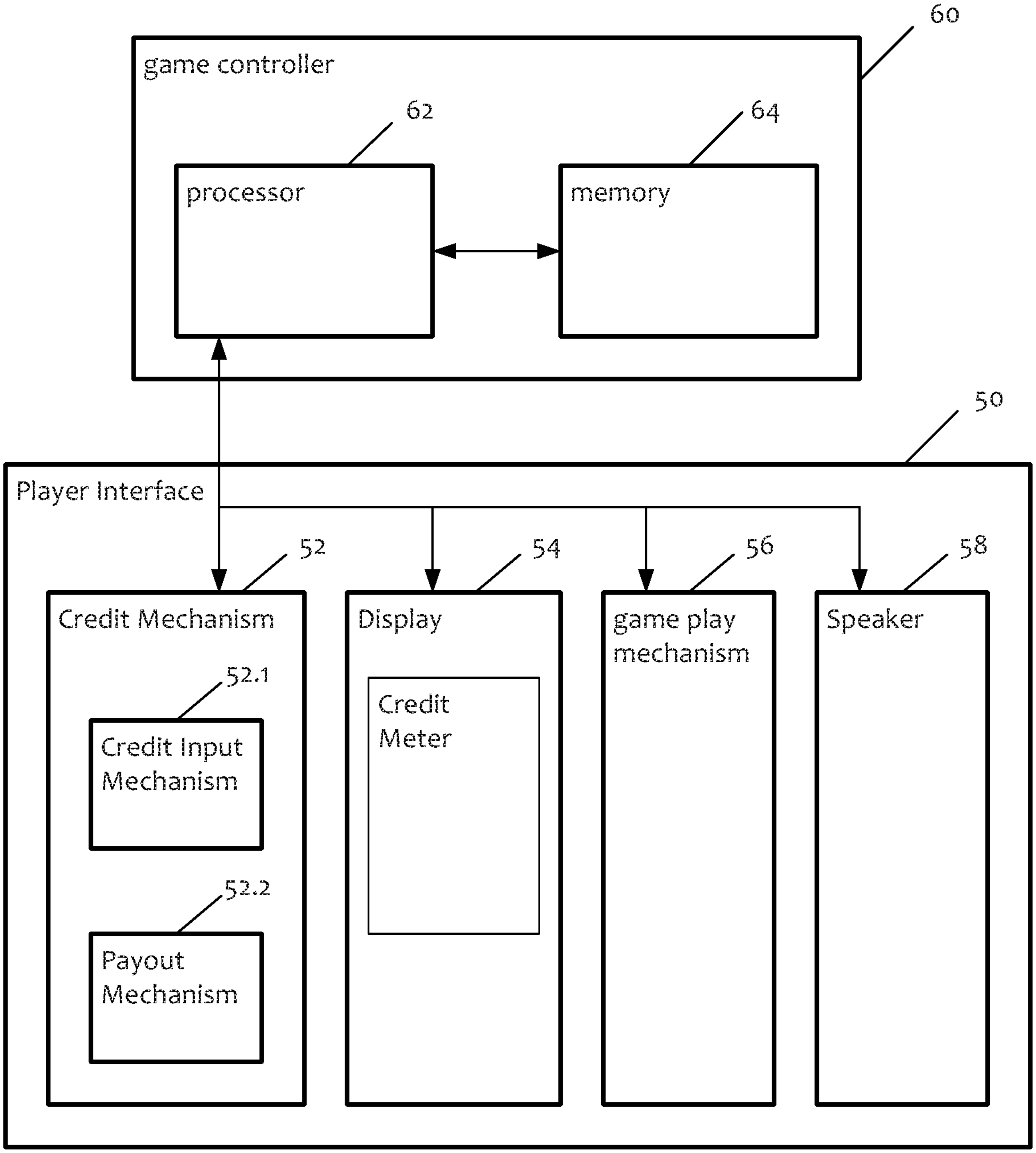
FIG. 1 is a block diagram of the core components of a gaming system.

Referring to the drawings, there is shown an embodiment of a gaming machine having a display to display symbols at a plurality of display positions and to display a plurality of prize identifiers. The gaming machine also includes a game controller to cause a display of a plurality of symbols at the display positions and visually moves a number of a plurality of prize identifiers at a first speed. If a trigger condition occurs with the displayed symbols, the game controller selects a prize identifier to be upgraded while visually moving the selected prize identifier being upgraded at a second speed on the display. The game controller completes the upgrading of the display while the selected prize identifier is being displayed.

General Construction of Gaming System

The gaming system can take a number of different forms. In a first form, a standalone gaming machine is provided wherein all or most components required for implementing the game are present in a player operable gaming machine.

In a second form, a distributed architecture is provided wherein some of the components required for implementing the game are present in a player operable gaming machine and some of the components required for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, architecture may be provided wherein a gaming machine is networked to a gaming server and the respective functions of the gaming machine and the gaming server are selectively modifiable. For example, the gaming system may operate in standalone gaming machine mode, "thick client" mode or "thin client" mode depending on the game being played, operating conditions, and so on. Other variations will be apparent to persons skilled in the art.

Referring to FIG. 1, the gaming system 1 has several core components. At the broadest level, the core components are a player interface 50 and a game controller 60. The player interface 50 enables manual interaction between a player and gaming system 1, and for this purpose includes input/output components required for the player to enter instructions to play a game and observe game outcomes.

Components of the player interface may vary from embodiment to embodiment but will typically include a credit mechanism 52 to enable a player to input credits. For example, in some embodiments, credit mechanism 52 may include a credit input mechanism 52.1 to receive a physical item representing a monetary value for establishing a credit balance. The credit balance may be increasable and decreasable based on wagering activities. Based on the established credit balance, the gaming system 1 initiates a game. In some embodiments, the credit mechanism 52 also includes a payout mechanism 52.2 to cause a payout associated with the credit balance. The player interface may also include one or more displays 54, a game play mechanism 56 including one or more input devices that enable a player to input game play instructions (e.g. to place a wager), and one or more speakers 58. In some embodiments, each of the displays 54 includes a plurality of display positions. In other embodiments, each of the displays 54 includes a plurality of display areas. Each of the display areas includes a plurality of display positions. In the embodiment shown, the display 54 also includes a credit meter 54.1. In some embodiments, credit meter 54.1 displays credits available, credits bet, and/or credits won.

Game controller 60 is in data communication with player interface 50 and typically includes a processor 62 that processes game play instructions in accordance with game play rules and outputs game play outcomes to the display(s) 54. Typically, the game play rules are stored as program code in a memory 64 but can also be hardwired. In some embodiments, the memory 64 may also store data indicative of a plurality of symbols, pay tables, images, and other information to be used in games. Herein the term "processor" is used to refer generically to any device that can process game play instructions in accordance with game play rules and may include: a microprocessor, microcontroller, programmable logic device or other computational device, a general purpose computer (e.g. a PC) or a server. That is, a processor may be provided by any suitable logic circuitry for receiving inputs, processing them in accordance with instructions stored in memory and generating outputs (for example on the display). Such processors are sometimes also referred to as central processing units (CPUs). Most processors are general purpose units, however, it is also known to provide a specific purpose processor using an application specific integrated circuit (ASIC) or a field programmable gate array (FPGA).

Figure 2:
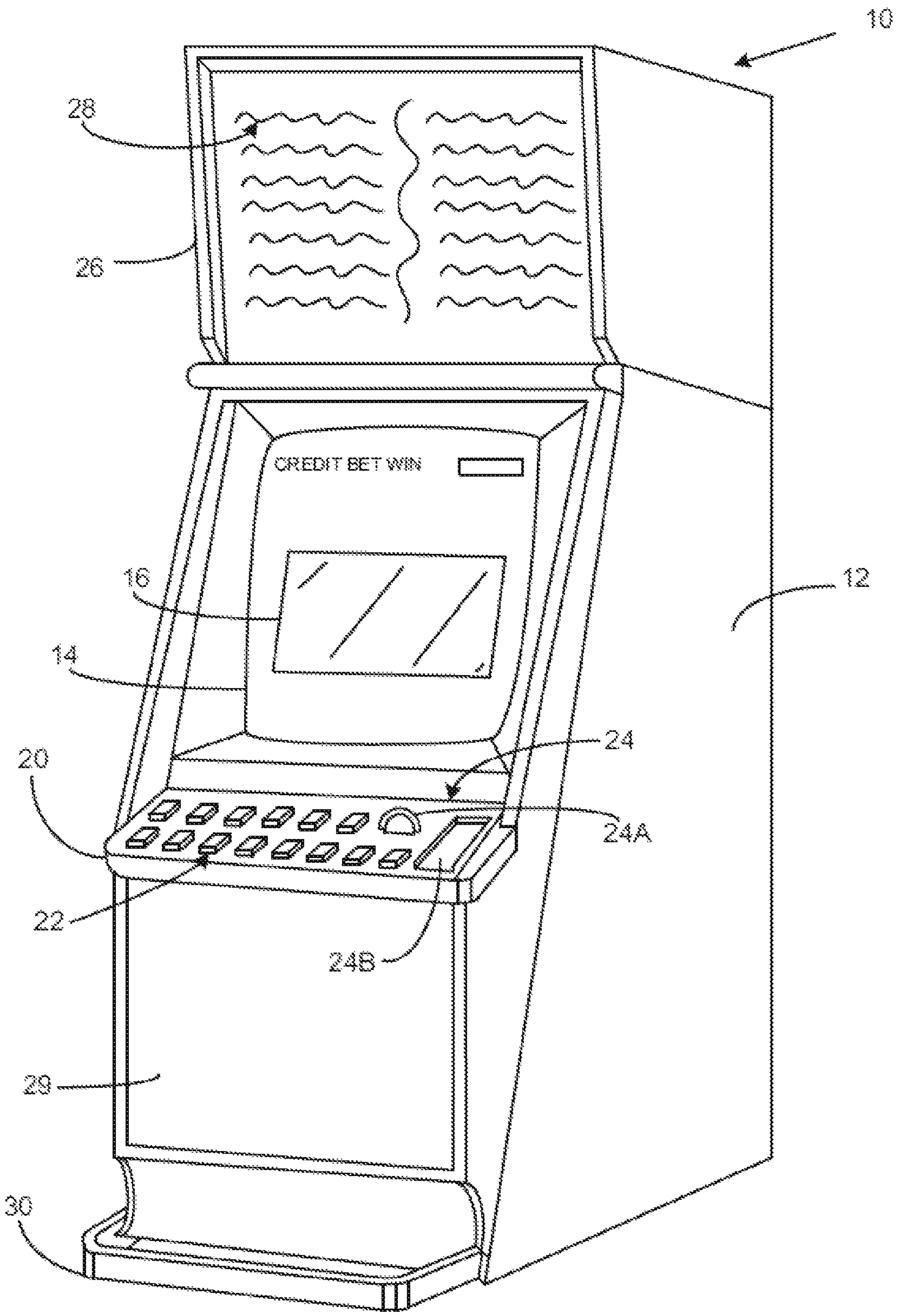
FIG. 2 is a perspective view of a standalone gaming machine.

Referring to FIG. 2, a gaming system in the form of a standalone gaming machine 10 includes a console 12 having a display 14 on which are displayed representations of a game 16 that can be played by a player. Mid-trim 20 of the gaming machine 10 houses a bank of buttons 22 for enabling a player to interact with the gaming machine, in particular during game play. The mid-trim 20 also houses a credit input mechanism 24 (similar to credit input mechanism 52.1 of FIG. 1) which in this example includes a coin input chute 24A and a bill collector 24B. Other credit input mechanisms may also be employed, for example, a card reader for reading a smart card, debit card or credit card. Other gaming machines may be configured to accept a ticket such that the credit input mechanism 24 may have a ticket reader (not shown) for reading tickets having a value and crediting the player based on the face value of the ticket. A player marketing module (not shown) having a reading device may also be provided for the purpose of reading a player tracking device, for example as part of a loyalty program. The player tracking device may be in the form of a card, flash drive or any other portable storage medium capable of being read by the reading device. In some embodiments, the player marketing module may provide an additional credit mechanism, either by transferring credits to the gaming machine from credits stored on the player tracking device or by transferring credits from a player account in data communication with the player marketing module.

As shown in FIG. 2, a top box 26 may carry artwork 28, including for example pay tables and details of bonus awards and other information or images relating to the game. Further artwork and/or information may be provided on a front panel 29 of the console 12. Gaming machine 10 also includes a payout mechanism in the form of a coin tray 30 that is mounted beneath front panel 29 for dispensing cash payouts from gaming machine 10. Another form of a payout mechanism may include an embedded printer to print out a payout ticket associated with the credit balance that may be redeemed at a cage (not shown).

Display 14 shown in FIG. 2 is in the form of a liquid crystal display. Alternatively, display 14 may be a light emitting diode display, plasma screen, and/or any other suitable video display unit. Top box 26 may also include a display, for example a video display unit, which may be of the same type as display 14, or of a different type.

Figure 3:
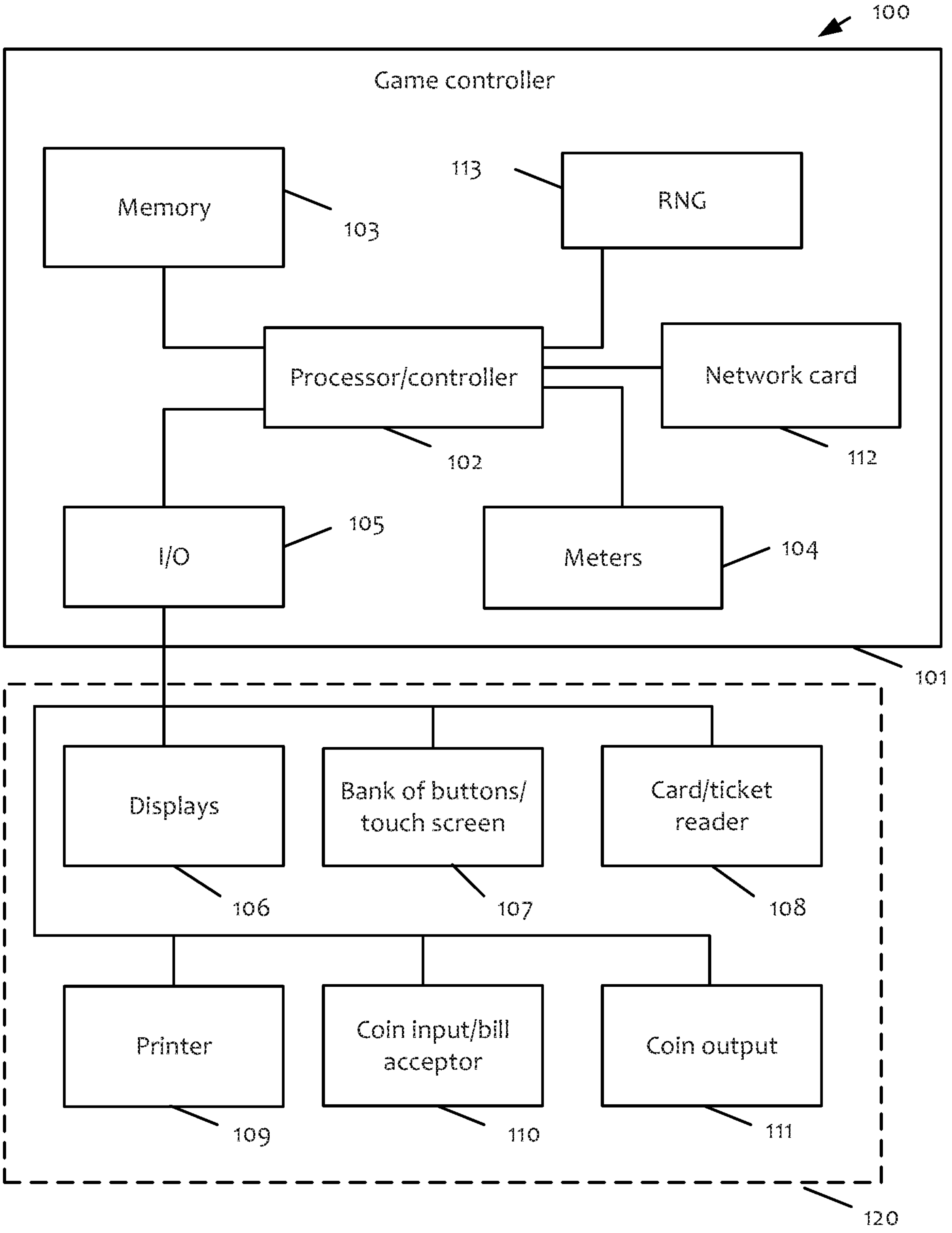
FIG. 3 is a block diagram of the functional components of a gaming machine.

FIG. 3 shows a block diagram of operative components of a typical gaming machine which may be the same as or different to the gaming machine of FIG. 2.

As shown in FIG. 3, a gaming machine 100 includes a game controller 101 having a processor 102 mounted on a circuit board. Instructions and data to control operation of processor 102 are stored in a memory 103, which is in data communication with the processor 102. Typically, gaming machine 100 will include both volatile and non-volatile memory and more than one of each type of memory, with such memories being collectively represented by the memory 103.

Gaming machine 100 has hardware meters 104 for purposes including ensuring regulatory compliance and monitoring player credit, and an input/output (I/O) interface 105 for communicating with peripheral devices of the gaming machine 100. Input/output (I/O) interface 105 and/or the peripheral devices may be intelligent devices with their own memory for storing associated instructions and data for use with the input/output interface or the peripheral devices. A random number generator module 113 generates random numbers for use by processor 102. Persons skilled in the art will appreciate that the reference to random numbers includes pseudo-random numbers.

In the example shown in FIG. 3, a player interface 120 includes peripheral devices that communicate with game controller 101 including one or more displays 106, a touch screen and/or buttons 107 (which provide a game play mechanism), a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation. For example, while buttons or touch screens are typically used in gaming machines to allow a player to place a wager and initiate a play of a game, any input device that enables the player to input game play instructions may be used. For example, in some gaming machines a mechanical handle is used to initiate a play of the game. Persons skilled in the art will also appreciate that a touch screen can be used to emulate other input devices, for example, a touch screen can display virtual buttons which a player can "press" by touching the screen where they are displayed.

In addition, gaming machine 100 may include a communications interface, for example a network card 112. Network card may, for example, send status information, accounting information or other information to a bonus controller, central controller, server or database and receive data or commands from the bonus controller, central controller, server or database. In embodiments employing a player marketing module, communications over a network may be via player marketing module—i.e. the player marketing module may be in data communication with one or more of the above devices and communicate with it on behalf of the gaming machine.

Figure 4:
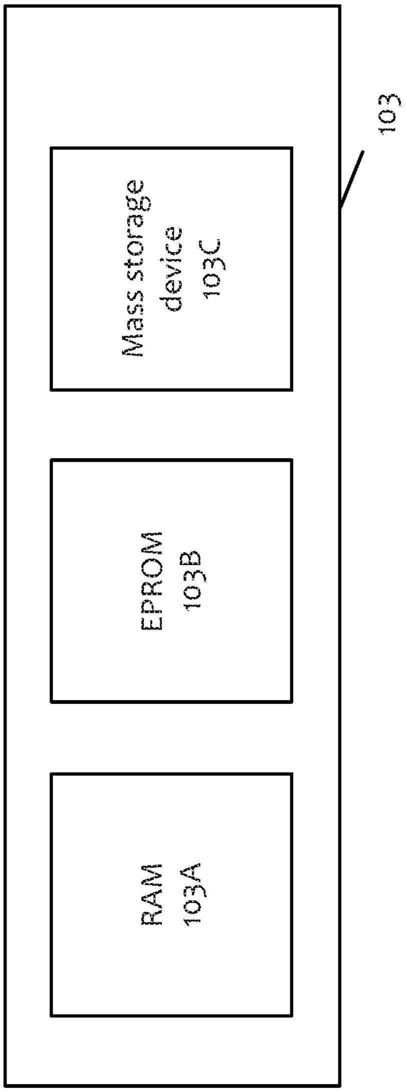
FIG. 4 is a schematic diagram of the functional components of a memory.

Referring now to FIG. 4, the main components of an exemplary memory 103 include RAM 103A, EPROM 103B and a mass storage device 103C. RAM 103A typically temporarily holds program files for execution by processor 102 and related data. EPROM 103B may be a boot ROM device and/or may contain some system or game related code. Mass storage device 103C is typically used to store game programs, the integrity of which may be verified and/or authenticated by the processor 102 using protected code from EPROM 103B or elsewhere.

It is also possible for the operative components of gaming machine 100 to be distributed, for example, input/output devices 106, 107, 108, 109, 110, 111 may be provided remotely from the game controller 101.

Figure 5:
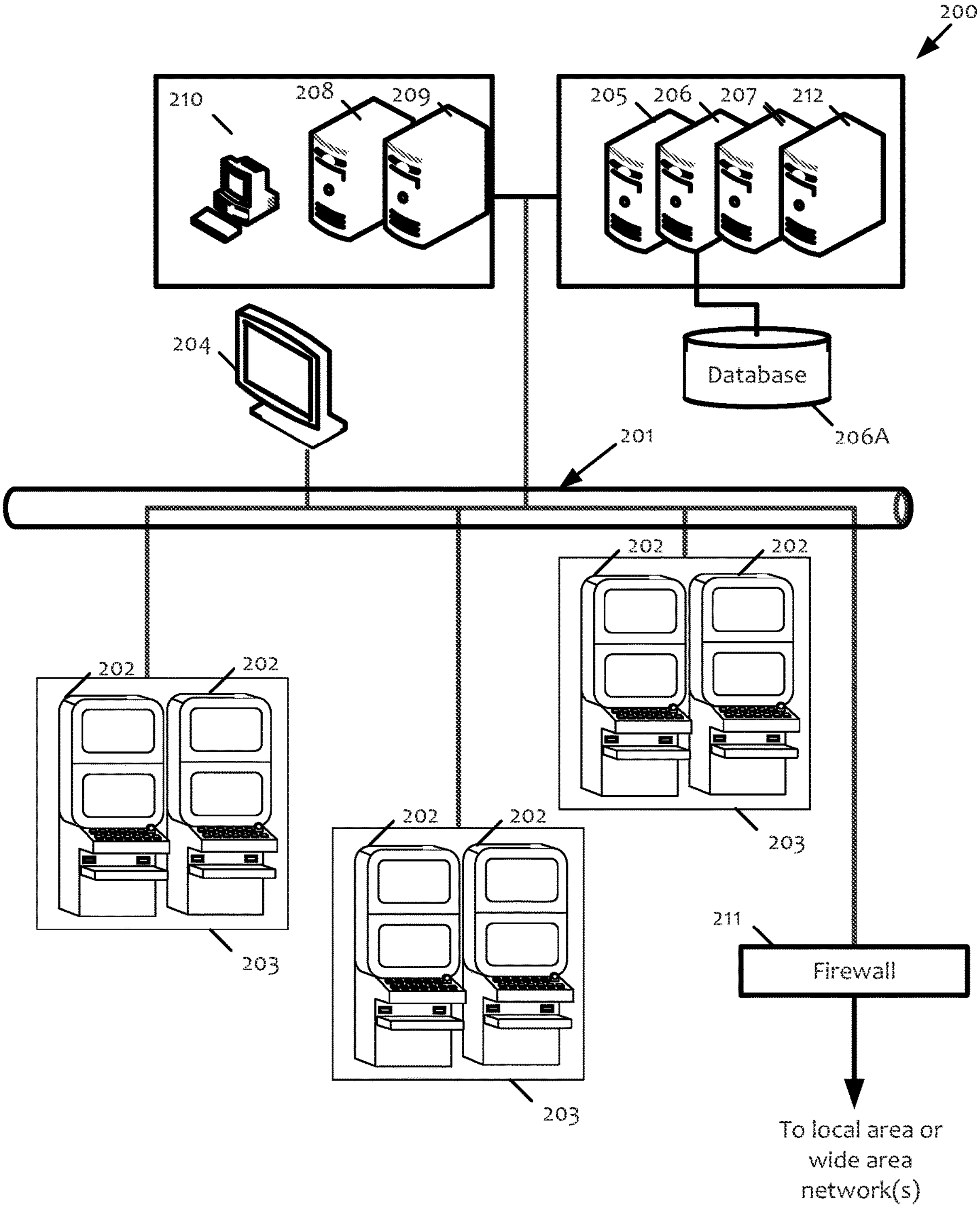
FIG. 5 is a schematic diagram of a network gaming system.

FIG. 5 shows a gaming system 200 in accordance with an alternative embodiment. Gaming system 200 includes a network 201, which for example may be an Ethernet network. Gaming machines 202, shown arranged in three banks 203 of two gaming machines 202 in FIG. 5 are connected to network 201. Gaming machines 202 provide a player operable interface and may be the same as the gaming machines 10, 100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to network 201. For example, displays 204 may be associated with one or more banks 203 of gaming machines. Displays 204 may be used to display representations associated with game play on gaming machines 202, and/or used to display other representations, for example promotional or informational material.

In a thick client embodiment, a game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by gaming machines 202 in a database 206A. Typically, if the gaming system enables players to participate in a jackpot game, a jackpot server 207 will be provided to perform accounting functions for the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components. Other client/server configurations are possible, and further details of a client/server architecture can be found in WO 2006/052213 and PCT/SE2006/000559, the disclosures of which are incorporated herein by reference.

Servers are also typically provided to assist in the administration of the gaming network 200, including for example a gaming floor management server 208, and a licensing server 209 to monitor the use of licenses relating to particular games. An administrator terminal 210 is provided to allow an administrator to run network 201 and the devices connected to the network.

Gaming system 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, game server 205 could run a random number generator engine. Alternatively, a separate random number generator server could be provided. Further, persons skilled in the art will appreciate that a plurality of game servers could be provided to run different games or a single game server may run a plurality of different games as required by the terminals.

Further Detail of Gaming System

When credit input mechanism 52.1 (of FIG. 1) has received a physical item representing a monetary value, a credit balance is established. The player may then operate the game play mechanism 56 (of FIG. 1) to specify one or more of a plurality of wagers for the base game and to initiate a play of the base game. In an exemplary embodiment, at least certain of the wagers that the player can make entitles the player to win a chance to play a feature game, for example, when a trigger condition occurs. In some embodiments, when the credit input mechanism 52.1 (of FIG. 1) has received a physical item representing a monetary value for establishing a credit balance, at least a portion of the received physical item may initiate a play of the base game directly.

Figure 6:
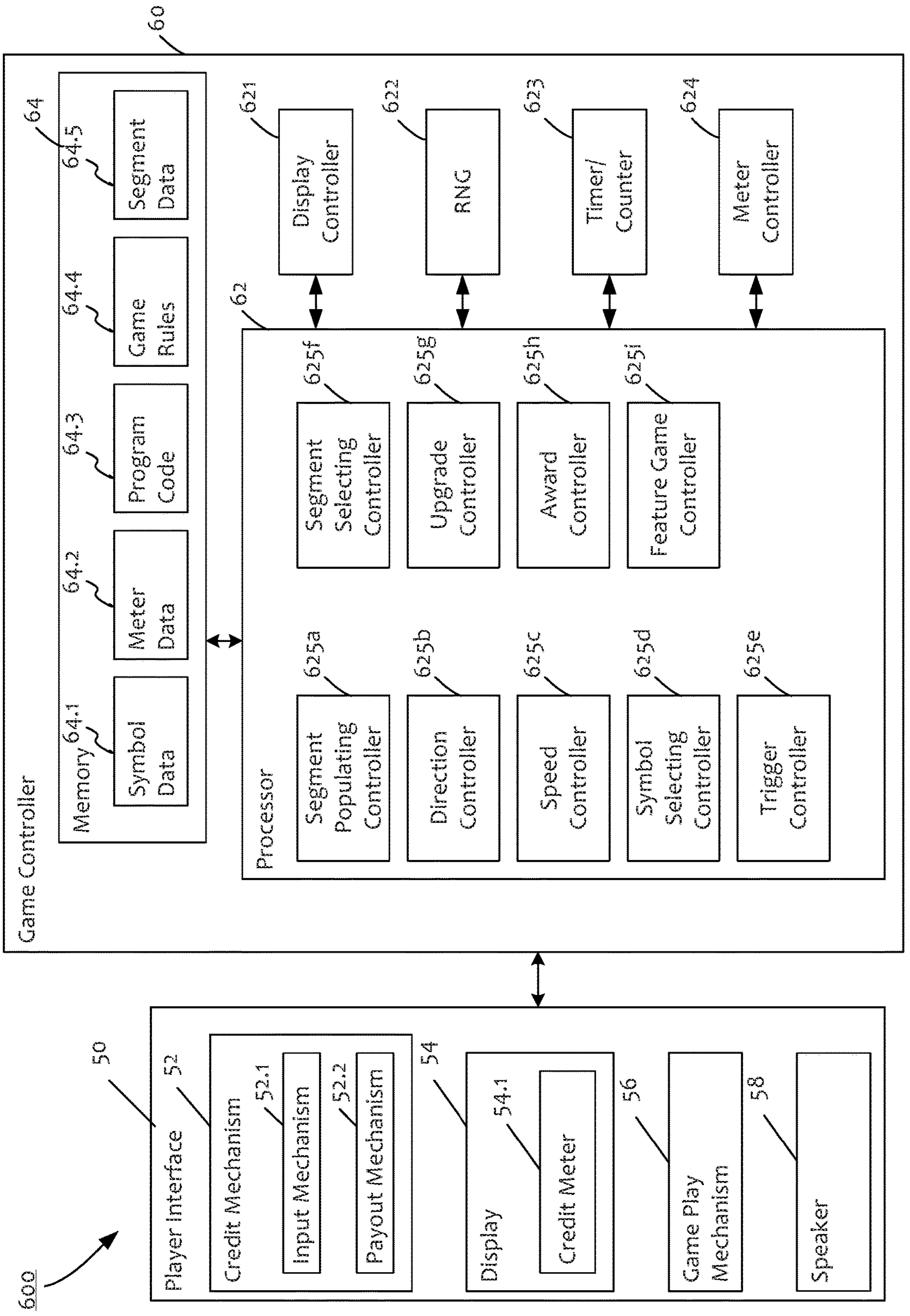
FIG. 6 is an exemplary gaming machine in block diagram form.

Referring to FIG. 6, a gaming machine 600 (similar to the gaming machine 10 of FIG. 2) includes a game controller 60. Game controller 60 includes a processor 62 and a memory 64. Memory 64 includes a symbol memory module 64.1 that stores data of a plurality of symbols, a meter memory module 64.2 that stores meter data of gaming machine 600, and a program code memory 64.3 that stores program code to implement a number of modules to be executed by processor 62. In the embodiment, memory 64 also includes a game rules memory module 64.4 that stores a plurality of game rules. Game controller 60 also includes a segment data module 64.5 that stores a plurality of prize identifiers to be associated with respective prize segments.

Persons skilled in the art will appreciate that some or all of the components of the game controller 60 could be alternatively implemented. For example, in some embodiments, the game controller 60 and its components are implemented in the form of a dedicated circuit, or an individual application-specific-integrated-circuit (ASIC). In other embodiments, game controller 60 and its components is implemented as an individual ASIC. In other embodiments, some or all of the game controller components may be individually or collectively implemented as software modules, controllers, and/or circuitries.

In the embodiment, game controller 60 includes a display controller 621 which is configured to control display 54, a random number generator (RNG) 622 configured to generate a random number, and a timer/counter 623 configured to time and/or count an amount of time and/or a number of games that a base game has been played, for example, without a win, an upgrade, and/or a trigger event. The timer/counter 623 may also count a number of free spins in a feature game. Game controller 60 also includes a meter controller 624 configured to generate meter data, for example, for display or storage based on game play, and/or to read meter data from the meter memory 64.2.

In the embodiment shown, the processor 62 includes a segment populating controller **625*a* that communicates with the display controller 621, the RNG 622, the timer/counter 623, and/or the meter controller 624. In some embodiments, the segment populating controller 625*a* populates a plurality of vertical segments of a vertical feature wheel with a plurality of jackpot prizes. For example, the segment populating controller 625*a* populates the vertical segments with a plurality of prize identifiers, for example, in the form of a plurality of numbers identifying a number of free games, a plurality of progressive jackpot prizes, mini jackpot prizes, minor jackpot prizes, major jackpot prizes, and grand jackpot prizes. In other embodiments, the segment populating controller 625*a*** populates a plurality of horizontal segments of a vertical feature wheel with the plurality of jackpot prizes.

In the embodiment shown, the processor 62 includes a direction controller **625*b* that controls directional movements of the vertical segments. For example, the direction controller 625*b* may control the vertical segments to laterally move from left to right. In other embodiments, the direction controller 625*b* may control the vertical segments to laterally move from right to left. In yet other embodiments, the direction controller 625*b* may control the horizontal segments to move down from top to bottom. In still other embodiments, the direction controller 625*b* may control the horizontal segments to move up from bottom to top. Thus, for example, when the direction controller 625*b* laterally moves a vertical segment that is not presently displayed, or an invisible vertical segment, into the display 54, the display controller 621 controls the display 54 to animate the invisible vertical segment laterally moving into the display 54, for example, from a left edge of the display 54 into the display 54, while laterally moving a previously displayed vertical segment near a right edge of the display 54 out of the display 54. For another example, when the direction controller 625*b* vertically moves a horizontal segment that is not presently displayed, or an invisible horizontal segment, into the display 54, the display controller 621 controls the display 54 to animate the invisible horizontal segment vertically moving into the display 54, for example, from a bottom edge of the display 54 up into the display 54, while vertically moving a previously displayed horizontal segment near a top edge of the display 54 out of the display 54**.

In the embodiment shown, the processor 62 includes a speed controller **625*c* that controls speeds at which the vertical or horizontal segments are moved. For example, the speed controller 625*c* controls the directional movements of the vertical segments to move laterally at a first speed during an idle time, at a second speed during play of a base game before a trigger event occurs in the base game, a third speed during play of a base game when a trigger event occurs in the base game and when a segment selected to be upgraded is not yet displayed on the display 54, and a fourth speed during play of a base game when a trigger event occurs in the base game and when a segment selected to be upgraded is being displayed on the display 54. The speed controller 625***c* determines speeds at which the segments are moved based on a number of factors. Exemplary factors include a number of segments to be displayed on display 54, a total number of segments, an amount of upgrade to a segment, and the second speed, the third speed, and the fourth speed. In some embodiments, the first speed is a slow speed that allows a player to visually see the prize identifiers to be won in a feature game while the player is playing a base game.

In embodiments where the segments are vertical and moving left to right, the second speed during play of a base game before a trigger event occurs in the base game may be equal to the first speed. For another example, in embodiments where the segments are vertical and moving left to right, the third speed during play of a base game when a trigger event occurs in the base game and when a segment selected to be upgraded is not yet displayed on the display 54 may depend on whether the invisible vertical segment has moved out of the right edge of the display 54, or whether the invisible vertical segment is about to move into the left edge of the display 54. For another example, in embodiments where the segments are vertical and moving left to right, the third speed during play of a base game when a trigger event occurs in the base game and when a segment selected to be upgraded is not yet displayed on the display 54 may be slower for a large amount of upgrade than that for a small amount of upgrade, thus allowing more time for the display 54 to display the large amount of upgrade.

In some embodiments, the speed controller 625*c* also controls speeds at which an upgrade is displayed. For example, in embodiments where the segments are vertical and moving left to right, and when the speed controller 625*c* keeps the third speed constant, the speed controller 625*c* controls a display speed of an upgrade of a prize identifier. For example, if the display 54 displays ten segments moving with a third speed at 2 segments per second, and an upgrade of 12500 credits on a segment with a prize identifier of 50000 credits, the speed controller 625*c* also controls to display an upgrade of 12500 credits in 5 seconds, which results in a display speed of 2500 credits per second.

Referring back to FIG. 6, the processor 62 includes a symbol selecting controller 625*d* to select symbols from the symbol data 64.1 for display on the display 54. The display controller 621 then causes the display 54 to display the selected symbols at a plurality of display positions. The displayed symbol thus form an outcome from the symbols displayed at the display positions.

Figure 7A:
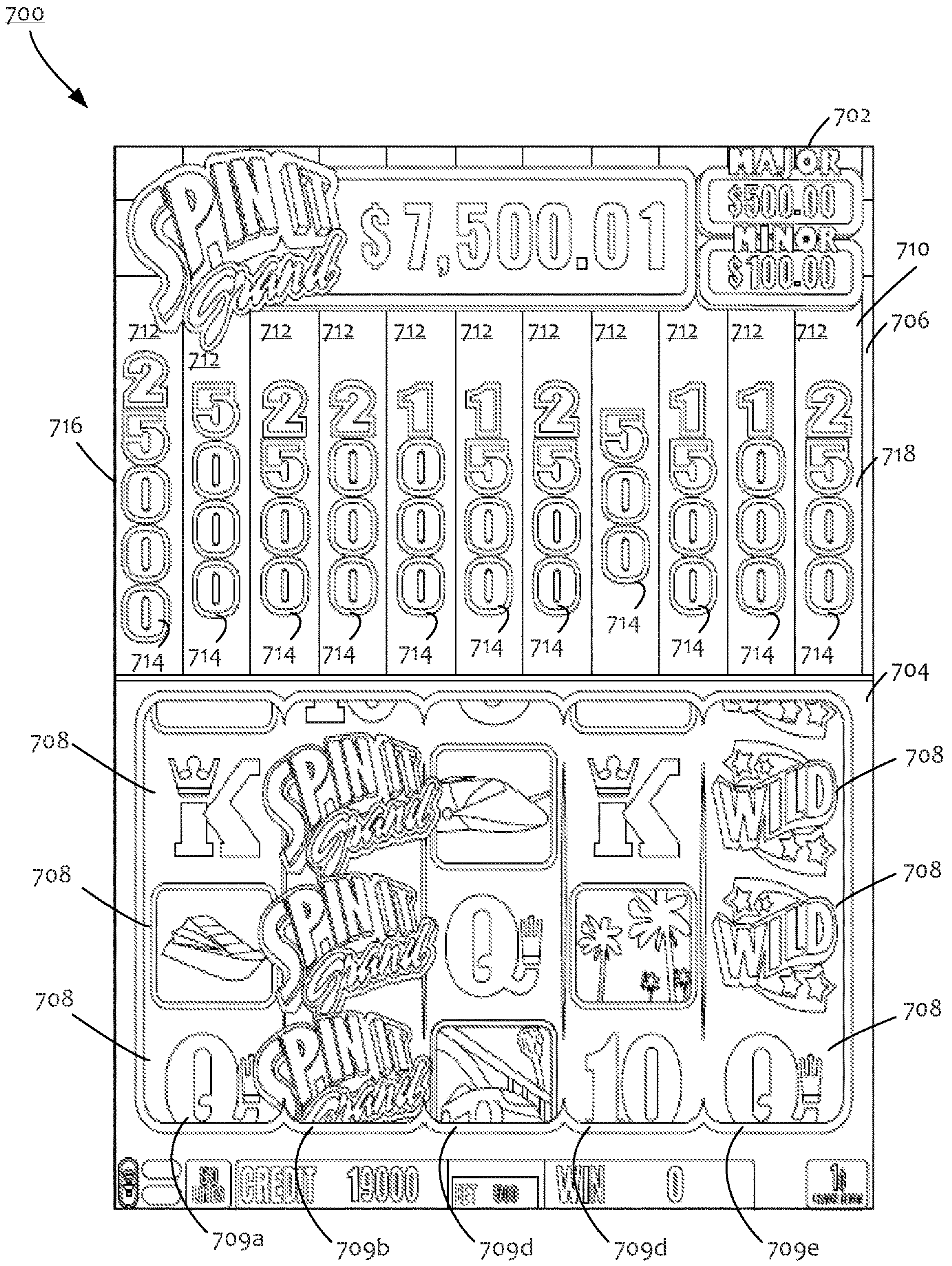
FIG. 7A illustrates an exemplary base game.

FIG. 7A illustrates an exemplary base game 700 displayed on a display 702 (similar to display 54). The display 702 has a first display area 704, and a second display area 706. The first display area 704 includes a plurality of display positions 708. In the embodiment shown, the display positions 708 form a 3×5 array (3 rows and 5 columns). In the embodiment, the columns are spinning reels 709*a*, 709*b*, 709*c*, 709*d*, 709*e* spinning vertically and come to stop to display the symbols selected by the symbol selecting controller 625*d*. The displayed symbols form an outcome of the base game 700. When the outcome includes a combination of predetermined symbols, an award is provided. A feature game may be triggered by a conventional trigger event, including a particular symbol outcome in the base game 700.

The second display area 706 displays a spinning wheel 710 formed from a plurality of vertical segments 712. As shown, the second display area 706 includes 11 vertical segments 712. Each of the vertical segments 712 carries a prize identifier 714. Only a portion of the spinning wheel 710 is displayed in the second display area 706. As such, although the prize identifiers 714 are shown to carry an amount of credits in numerical forms, the vertical segments 712 that are to be moved into the second display area 706 may have prize identifiers 714 in non-numeral forms, such as, for example, mini jackpot prizes, minor jackpot prizes, major jackpot prizes, grand jackpot prizes, diamonds, and other graphical symbols, described hereinafter. In the embodiment shown, the direction controller 625*b* continuously laterally moves the vertical segments 712 from a left edge 716 of the second display area 706 to a right edge 718 of the second display area 706. As a vertical segment 712 moves into the second display area 706 from the left edge 716, a displayed vertical segment 712 moves out of the second display area 706 from the right edge 718. The lateral movement continues until a trigger event occurs, discussed hereinafter.

Referring back to FIG. 6, the processor 62 includes a trigger controller 625*e* that detects an occurrence of a trigger event. For example, the trigger controller 625*e* detects a trigger event based on the displayed symbols. In some embodiments, when the displayed symbols include one or more of a plurality of predetermined symbols, the trigger controller 625*e* detects a trigger event. For example, when the displayed symbols include a predetermined winning combination, the trigger controller 625*e* may also consider a trigger event has occurred. In other embodiments, other trigger events may be detected by the trigger controller 625*e*. For example, after the timer/counter 623 has determined a player has played a base game for a predetermined amount of time without any winning of the base game, a trigger event may be detected by the trigger controller 625*e*. For another example, the meter controller 624 may determine that a predetermined amount of credits have been wagered, for example, via ante bets, another trigger event may be detected by the trigger controller 625*e*.

Referring back to FIG. 6, the processor 62 also includes a segment selecting controller 625*f* to select a group of segments of the plurality of vertical segments to be upgradable, prior to or during play of the base game 700. In some embodiments, there are 20 segments and 3 of the segments may be selected to be upgradable segments. In other embodiments, the segment data 64.5 may specify 5 groups of 4 selectable segments, and the segment selecting controller 625*f* may select one of the 5 groups of selectable segments, thus allowing one or more segments of the four selectable segments of the selected group be upgraded. For example, the segment data 64.5 may specify a group of four jackpot prizes to be upgradable. The segment selecting controller 625*f* may also select a segment of the selected group of segments to be upgraded.

Referring back to FIG. 6, the processor 62 also includes an upgrade controller 625*g* to determine an amount of upgrade on a segment selected by the segment selecting controller 625*f*. The amount of upgrade on a selected vertical segment may also be determined by a predetermined multiple of an amount of credits wagered in the base game 700. For example, if a multiplier of 7 is used and the wager is 50 credits, then 350 credits is added to the prize identifier in the selected segment.

The upgrade controller 625*g* also determines if the selected segment is currently displayed on the second display area 706. If the upgrade controller 625*g* determines that the selected segment is not currently displayed on the second display area 706, the speed controller 625*c* increases the speed at which the segments are displayed such that the selected segment is displayed as entering the second display area 706 from the left edge 716. If the upgrade controller 625*g* determines that the selected segment is currently displayed on the second display area 706, the speed controller 625*c* determines a display speed, for example, an increment of number of credits per display frame, or per time unit, at which the amount of upgrade is visually shown to a player before the selected segment moves out of the second display area 706 from the right edge 718. For example, in some embodiments, when upgrading from 2000 credits to 2500 credits on a vertical segment, the speed controller 625*c* determines a number of credits at a time and thus the display speed, such that the 2000-credit segment incrementally changes to a 2500-credit segment by the determined number of credits at the determined speed. That is, the display controller 621 may control the display 54 to visually display an increment of credits by the determined number of credits at the speed, viewable by a player. In other embodiments, when upgrading from 2000 credits to 2500 credits on a vertical segment, the speed controller 625*c* determines a speed such that the 2000-credit segment changes to a 2500-credit segment instantaneously.

Figure 7B:
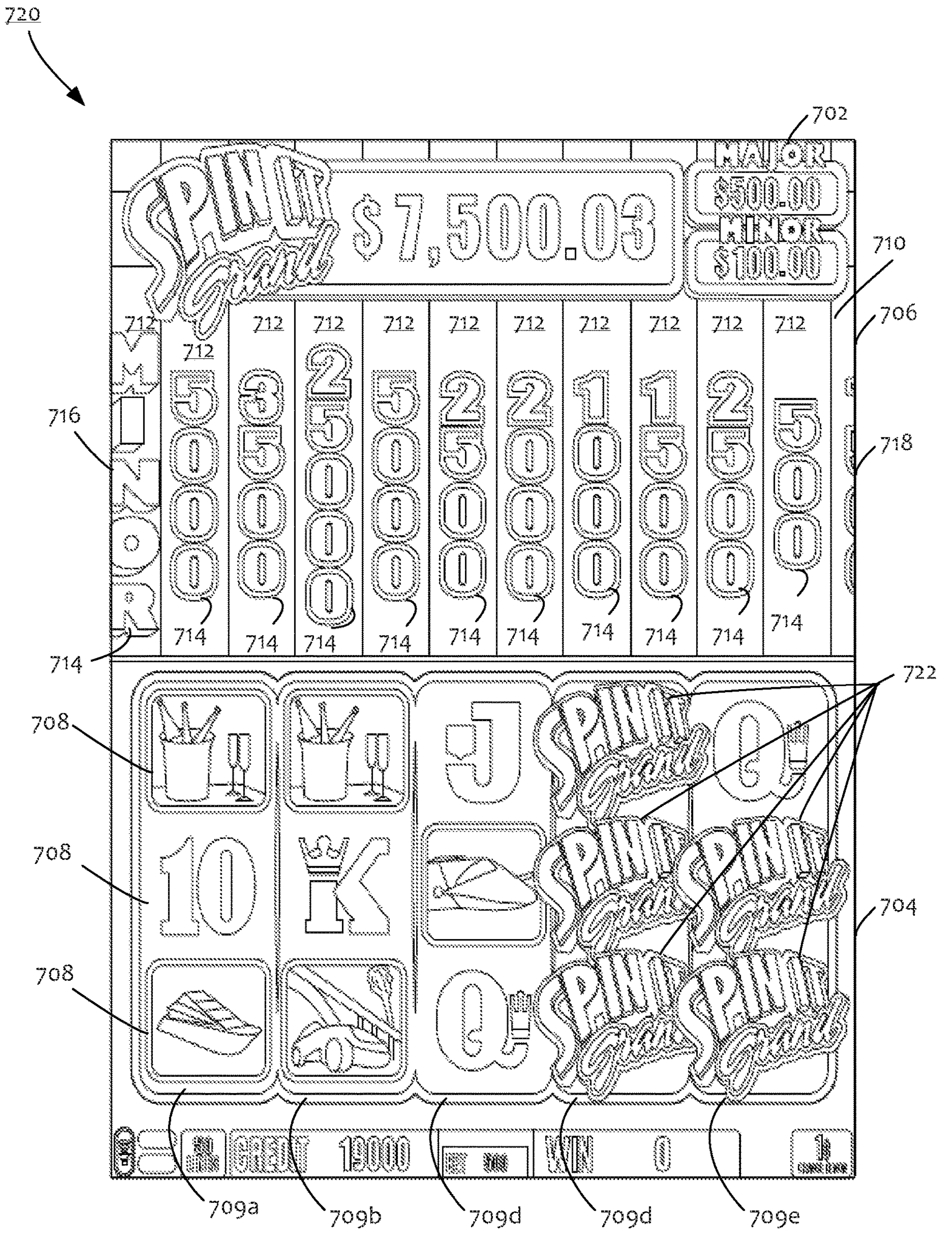
FIG. 7B illustrates a second exemplary base game.

FIG. 7B illustrates a second exemplary base game 720. In the second exemplary base game 720, the spinning reels 709*a*, 709*b*, 709*c*, 709*d*, 709*e* stop to display an outcome in which spinning reels 709*d*, 709*e* display a plurality of predetermined symbols in the form of five "Spin-It-Grand" symbols 722. The trigger controller 625*e* determines that a trigger event has occurred based on the five displayed "Spin-It-Grand" symbols 722.

When a trigger event occurs based on a plurality of predetermined symbols as detected by the trigger controller 625*e*, the segment selecting controller 625*f* randomly selects a segment of the plurality of vertical segments 712 to be upgraded. In some embodiments, as discussed above, the segment selecting controller 625*f* randomly selects a segment of a selected group of vertical segments to be upgraded.

In this embodiment, the segment selecting controller 625*f* selects a segment carrying a prize identifier of 50000 credits is to be upgraded. However, the upgrade controller 625*g* determines that the selected segment carrying the prize identifier of 50000 credits is not displayed in the second display area 706. As such, the speed controller 625*c* moves to assume the third speed such that the vertical segments 712 move faster so as to display the previously hidden segment carrying the prize identifier of 50000 credits entering the second display area 706. For example, in some embodiments, prize identifiers move at a first speed during general game play, until a trigger event occurs. The prize identifiers also move at the first speed in a continuous fashion so that at all times whilst the gaming machined 10 (of FIG. 1) is powered on, the prize identifiers are moving across the display 54 (of FIG. 1), regardless or independently of any game play which may or may not be occurring at the same time, which in turn has an effect of attracting players to the gaming machine 10. Once at the gaming machine 10, players can visually see all possible prize identifiers that may win from the prize feature, and furthermore all the possible prize combination results that may be won.

Figure 7C:
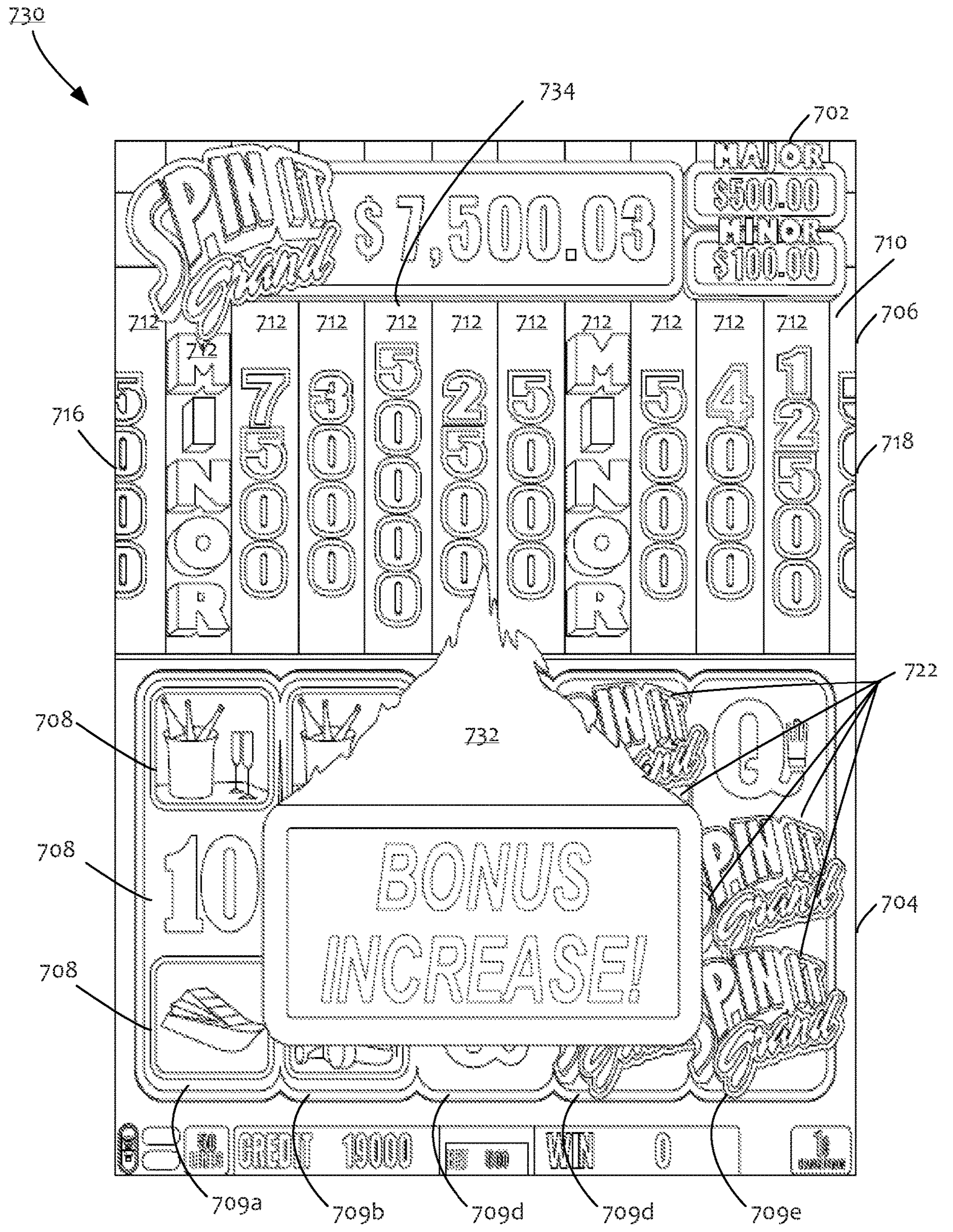
FIG. 7C illustrates an animation of a prize identifier upgrade.

FIG. 7C illustrates an animation of a prize identifier upgrade 730 based on an occurrence of the five displayed "Spin-It-Grand" symbols 722 upgrading a selected segment 734 carrying the prize identifier of 50000 credits. Specifically, when the trigger controller 625*e* detects five "Spin-It-Grand" symbols 722 are displayed, the display controller 621 animates on display 702 an upgrade flame 732 with text "BONUS INCREASE" indicating that an upgrade is initiated. In some embodiments, the upgrade flame 732 originates from the first display area 704 igniting the selected segment 734 having a prize identifier of 50000 credits. In some embodiments, igniting a selected segment may also be accompanied by an additional animation of a respective prize identifier. For example, upgrading a minor jackpot prize identifier that is animated as an ice block may also include an animation of melting of the ice block revealing a major jackpot prize identifier, while igniting the corresponding segment.

Figure 7D:
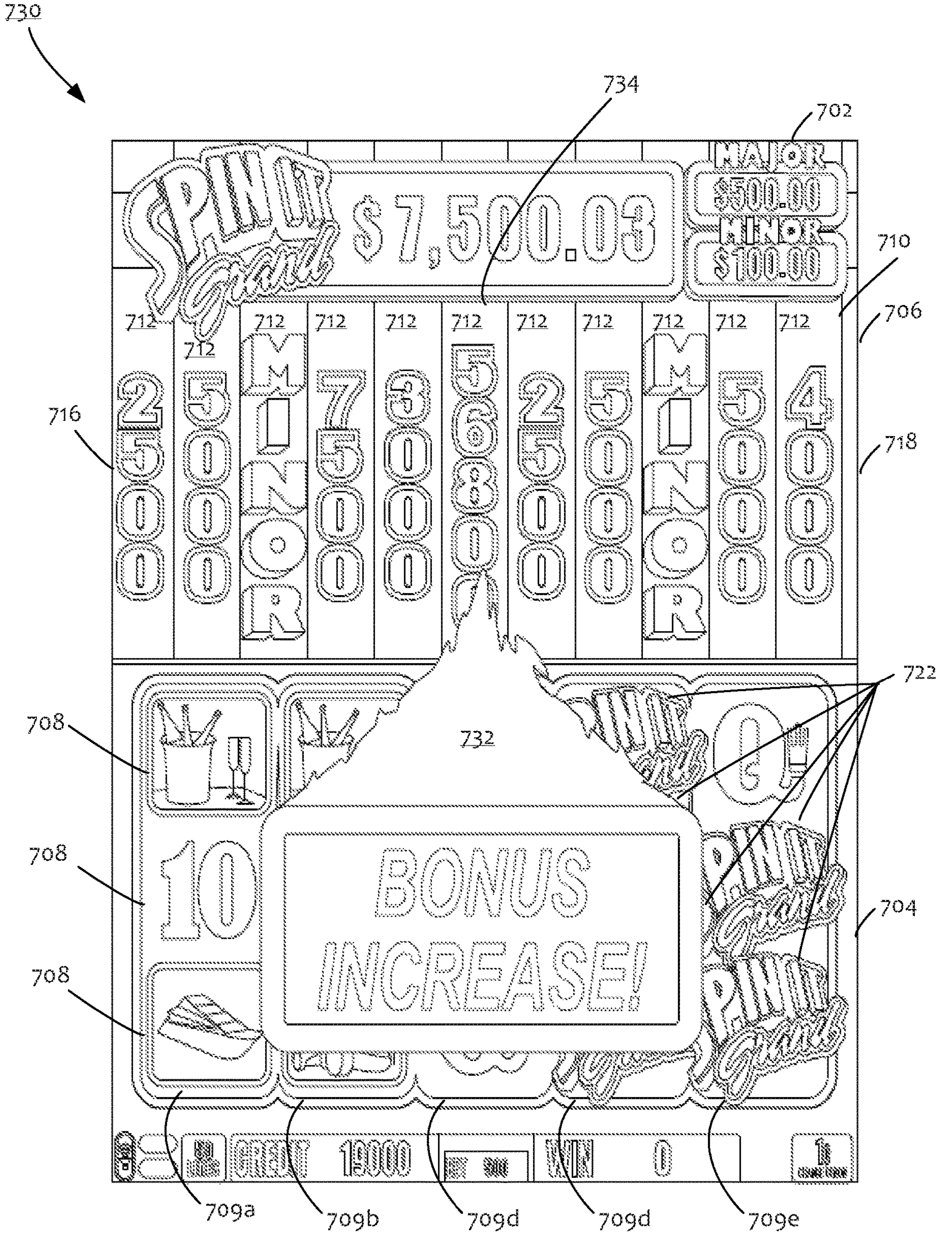
FIG. 7D illustrates a continuation of the animation of the prize identifier upgrade of FIG. 7C.
Figure 7E:
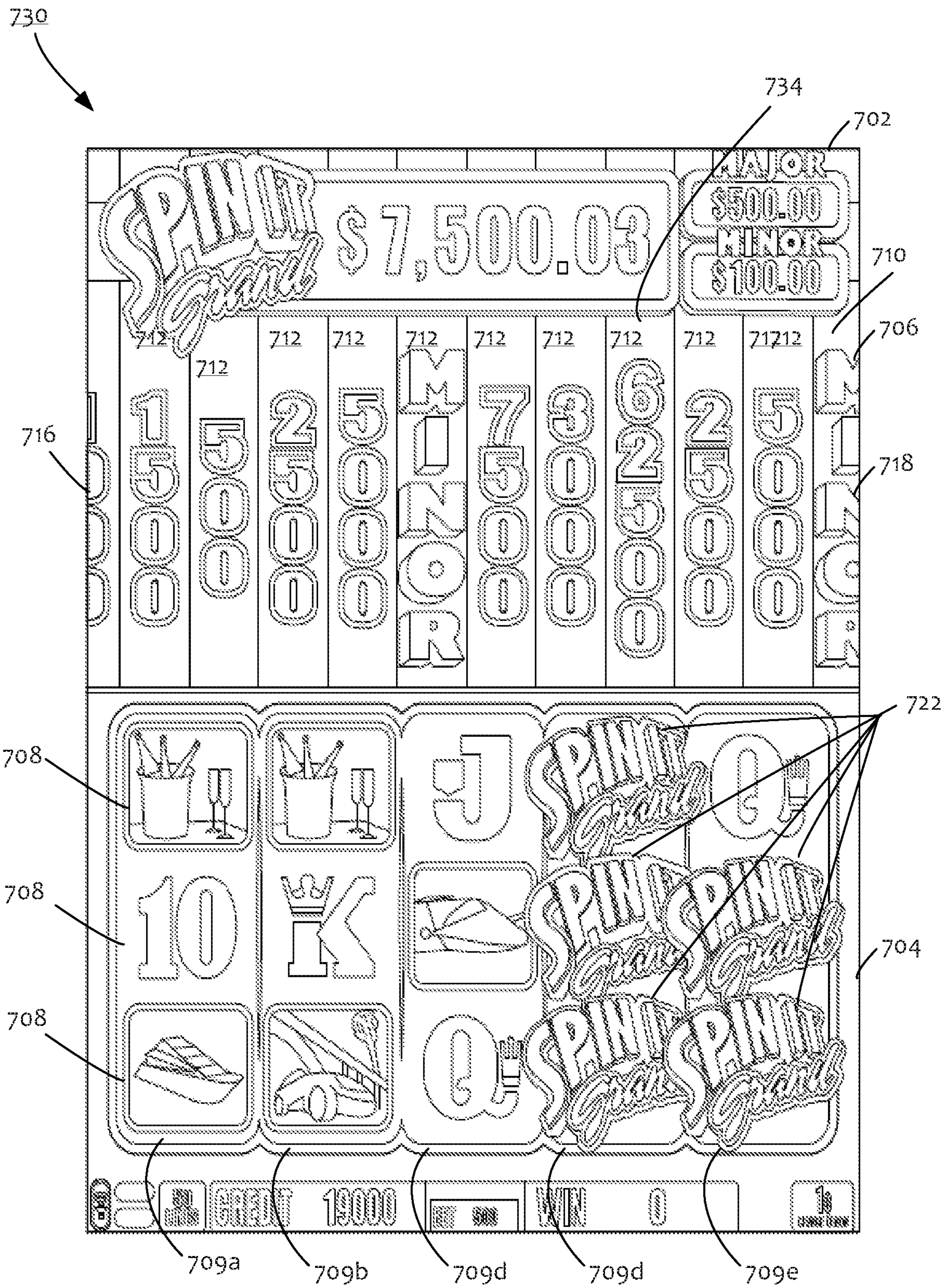
FIG. 7E illustrates a completion of the animation of the prize identifier upgrade of FIG. 7C.

In the embodiment shown, the upgrade controller 625*g* determines the amount of upgrade to be 12500 credits. Thus, the upgrade controller 625*g* also determines an upgrade speed for the change in value of the selected segment 734 to assume an upgrade from 50000 credits to 62500 credits before the selected segment 734 moves out of the second display area 706. FIG. 7D illustrates a continuation of the animation of the prize identifier upgrade 730 of FIG. 7C. As shown in FIG. 7D, the selected segment 734 has assumed an upgrade of only 6800 credits toward the 12500-credit upgrade, as segment 734 moves laterally across the second display area 706. FIG. 7D illustrates a completion of the animation of the 12500-credit upgrade 730. As shown in FIG. 7E, the selected segment 734 has now completed the upgrade of 12500 credits before the selected segment 734 moves out of the second display area 706, while continuing to move the vertical segments 712 laterally across the second display area 706. The upgraded segment 734 will then be used as one of the vertical segments 712 to be awardable to the player during play of a feature game.

Figure 8:
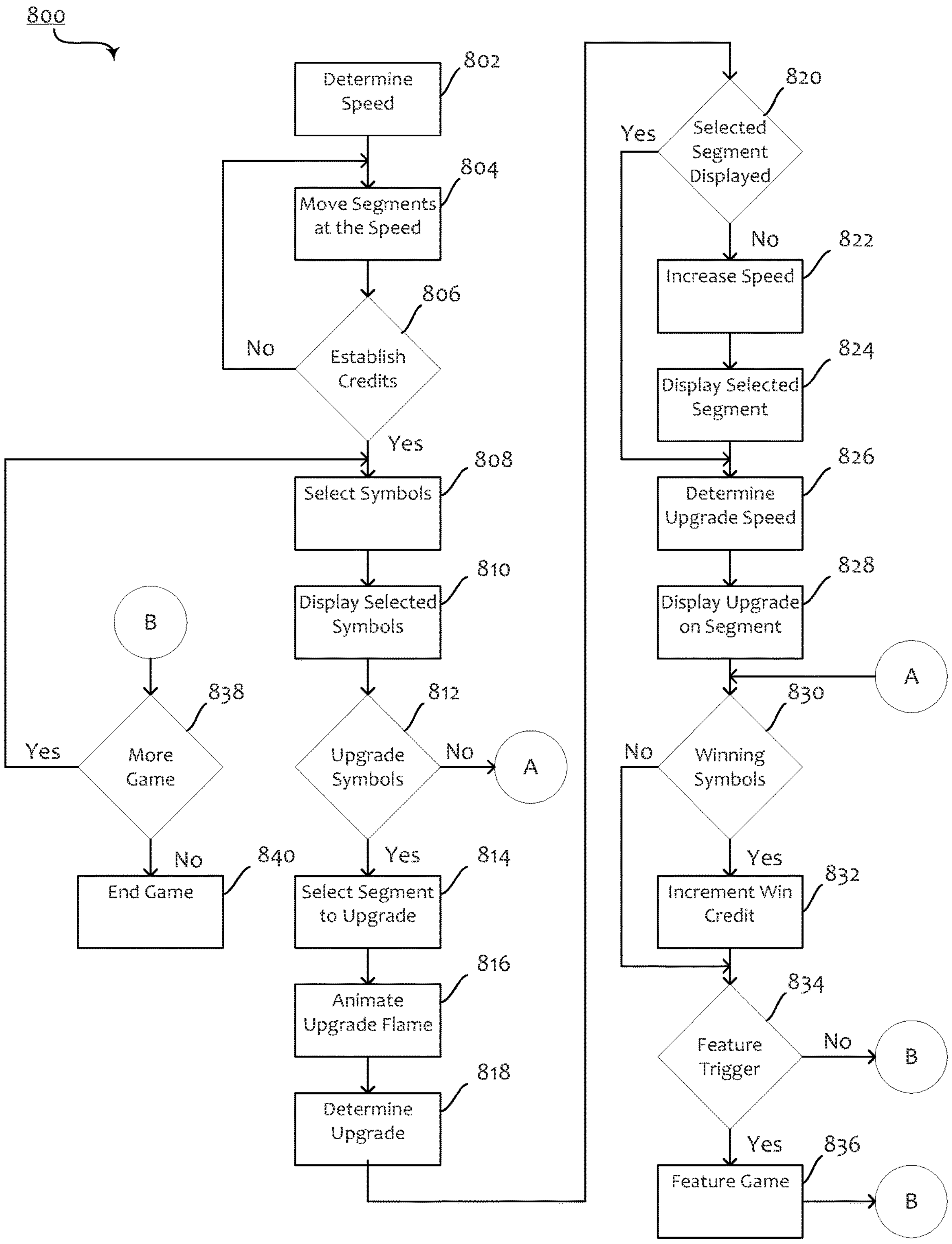
FIG. 8 illustrates a flow chart of an exemplary upgrade process.

FIG. 8 illustrates a flow chart of an exemplary upgrade process 800. When a gaming machine is idle, at block 802, the speed controller 625*c* determines a first speed at which a plurality of vertical segments (like vertical segments 712 of FIG. 7A) are moved, and, at block 804, the display controller 621 causes the second display area 706 to display the vertical segments moving laterally at the determined speed.

When the meter controller 624 determines that a credit has been established, for example, when the credit input mechanism 52.1 (of FIG. 1) has received a physical item representing a monetary value, as determined at block 806, the symbol selecting controller 625*d* selects a plurality of symbols from the symbol data memory module 64.1 for display at the first display area 704, for example, at the display positions 708 at block 810. The trigger controller 625*e* then determines if the displayed symbols include a predetermined number of predetermined or upgrade symbols at block 812. If the trigger controller 625*e* determines that the displayed symbols do not include any predetermined or upgrade symbols at block 812, the upgrade process 800 proceeds to block 830. However, if the trigger controller 625*e* determines that the displayed symbols include one or more predetermined or upgrade symbols at block 812, the upgrade process 800 proceeds to select a segment to upgrade via the segment selecting controller 625*f*, as discussed above, at block 814.

The upgrade process 800 at block 816 animates an upgrade flame with text "BONUS INCREASE" indicative that an upgrade is initiated, via the display controller 621, and at block 818 determines an amount of upgrade to be applied to the selected segment. At block 820, the upgrade process 800 determines if the selected segment is being displayed in the second display area 706, via upgrade controller 625*g*. If the upgrade process 800 determines that the selected segment is not being displayed in the second display area 706, the speed controller 625*c* increases the speed as determined in block 822, in block 824, such that the selected segment is displayed in second display area 706. If the upgrade process 800 determines that the selected segment is being displayed in the second display area 706, at block 820, the upgrade controller 625*g* determines an upgrade speed for the selected segment to assume, at block 826, and the selected segment is displayed and being upgraded at block 828.

At block 830, the upgrade process 800 determines if the displayed symbols displayed at block 810 include any winning combination of symbols. If upgrade process 800 determines that the displayed symbols include a winning combination of symbols, the meter controller 624 increments the credit meter 54.1 (of FIG. 1). If the upgrade process 800 determines that the displayed symbols do not include a winning combination of symbols, the trigger controller 625*e* determines if the displayed symbols include any feature trigger condition at block 834. If the upgrade process 800 determines the displayed symbols do not include any feature trigger condition, the upgrade process 800 determines if there are more games to be played, at block 838. If the upgrade process 800 determines that there are more games to be played, the upgrade process 800 returns to block 808. If the upgrade process 800 determines that there is no more game to be played, the upgrade process 800 ends, at block 840. If the trigger controller 625*e* determines that the displayed symbols include a feature trigger condition at block 834, the upgrade process 800 proceeds to initiate a feature game at block 836.

Referring back to FIG. 6, feature game controller 625*i* manages a feature game based on an occurrence of a trigger event as detected by the trigger controller 625*e*. The feature game controller 625*i* initiates a feature game when a predetermined condition or a trigger event occurs, and uses the prize identifiers 714 (including any upgraded prize identifiers) of the spinning wheel 710 to award a player winning a feature game. An award controller 625*h* controls an award in accord with plays in the base game and in the feature game.

Figure 9A:
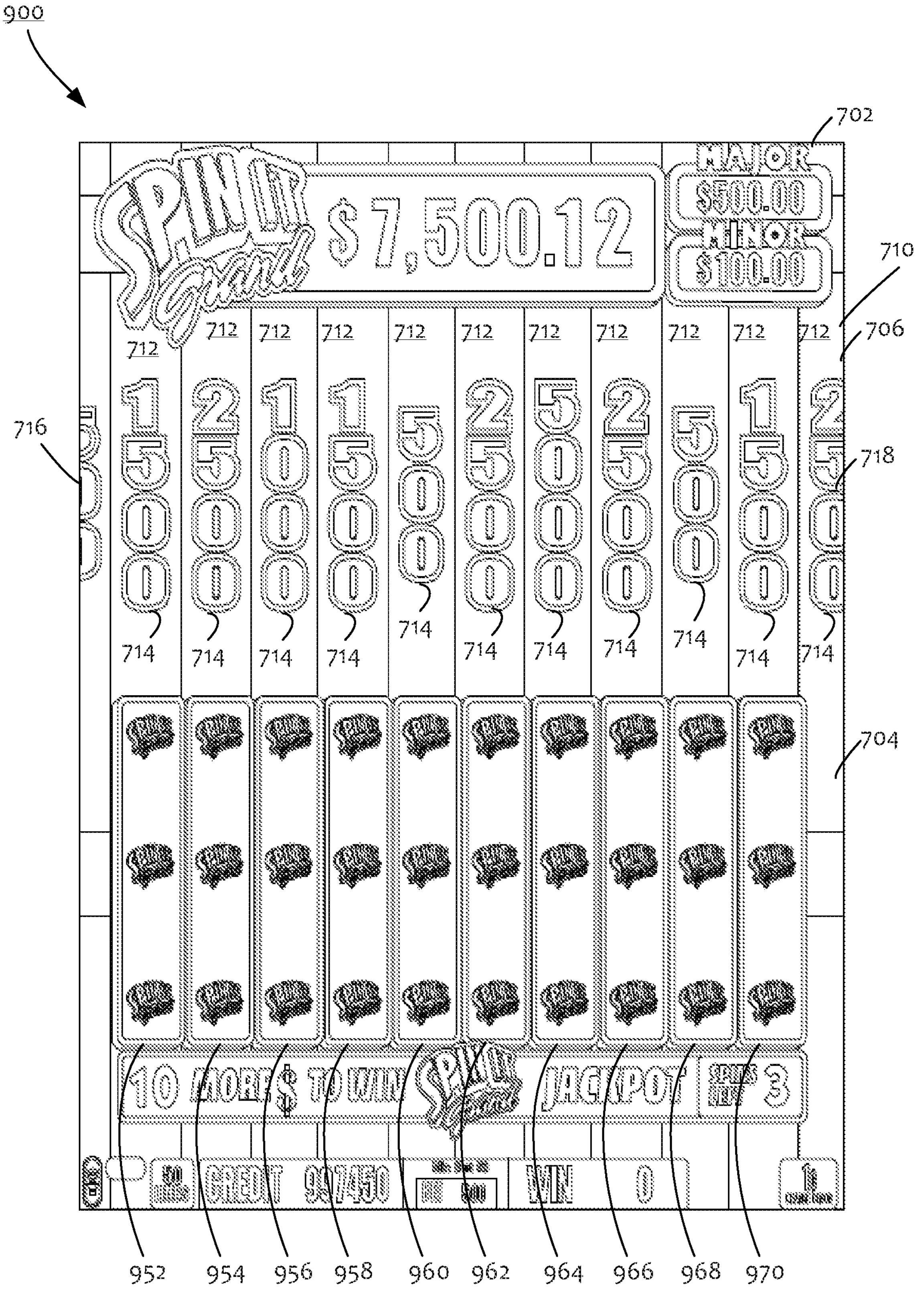
FIG. 9A illustrates an exemplary feature game.

FIG. 9A illustrates an exemplary feature game 900. When the feature game controller 625*i* (based on trigger controller 625*e*) initiates the feature game 900, the feature game controller 625*i* replaces the spinning reels 709*a*, 709*b*, 709*c*, 709*d*, 709*e* of the base game 700 (of FIG. 7A) with a plurality of tubes 952, 954, 956, 958, 960, 962, 964, 966, 968, 970. The tubes 952, 954, 956, 958, 960, 962, 964, 966, 968, 970 are initially empty. The feature game 900 continues to include the spinning wheel 710 that further includes a plurality of vertical segments 712 having respective prize identifiers 714 moving laterally at a feature speed set by speed controller 625*c* (of FIG. 6). In some embodiments, the feature speed is generally higher than the first speed of the base game 700 (of FIG. 7A). In some embodiments, the feature game 900 is a plurality of games of filling the empty tubes. For example, each of the tubes 952, 954, 956, 958, 960, 962, 964, 966, 968, 970 has a respective reel strip that has a predetermined feature symbol 918. In some embodiments, each of the tubes 952, 954, 956, 958, 960, 962, 964, 966, 968, 970 has only one predetermined feature symbol 918. In an exemplary feature game 900 that includes a series of three spins or tube fillings, if no predetermined feature symbol 918 is spun up, a spin is spent. However, if a predetermined feature symbol 918 is spun up at an exemplary tube, the predetermined feature symbol 918 is held at the exemplary tube for a subsequent spin, and the series of spins is reset back to three.

When a player actuates the game play mechanism 56 to play the feature game 900, the speed controller 625*c* initially increases the feature speed to accelerate the lateral movements of the vertical segments 712, and controllably slows down the lateral movements to a complete stop. While the vertical segments 712 are moving laterally across the second display area 706, the symbol selecting controller 625*d* randomly selects a plurality of symbols to fill the empty tubes 952, 954, 956, 958, 960, 962, 964, 966, 968, 970. In the embodiment shown, the empty tubes 952, 954, 956, 958, 960, 962, 964, 966, 968, 970 have a "Spin-It-Grand" background. In other embodiments, the empty tubes empty tubes 952, 954, 956, 958, 960, 962, 964, 966, 968, 970 may have different backgrounds, or no background at all.

Figure 9B:
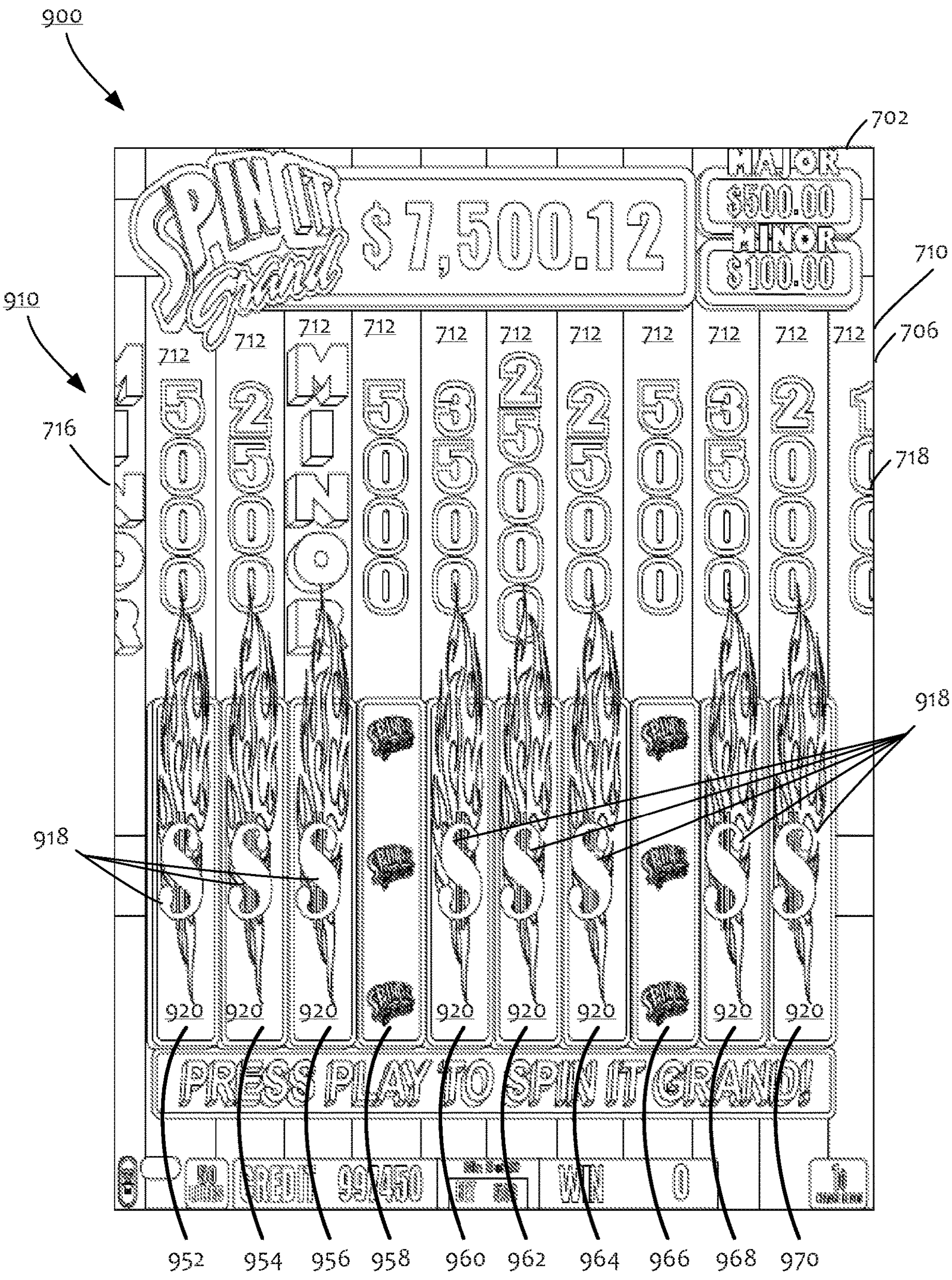
FIG. 9B illustrates an exemplary outcome of the feature game of FIG. 9A.

FIG. 9B illustrates an exemplary outcome 910 of the feature game 900 of FIG. 9A. The outcome 910 shows that tubes 952, 954, 956, 960, 962, 964, 968, 970, are filled with respective predetermined feature symbols 918. Tubes 958 and 966 are darkened because no symbols filled (moved into) tubes 958, 966. During the feature game 900, the tubes 952, 954, 956, 958, 960, 962, 964, 966, 968, 970 are spun, and only tubes 952, 954, 956, 960, 962, 964, 968, 970 have spun up the predetermined feature symbols 918. As shown, the predetermined feature symbols 918 are flaming dollar signs with respective flaming backgrounds 920.

Figure 9C:
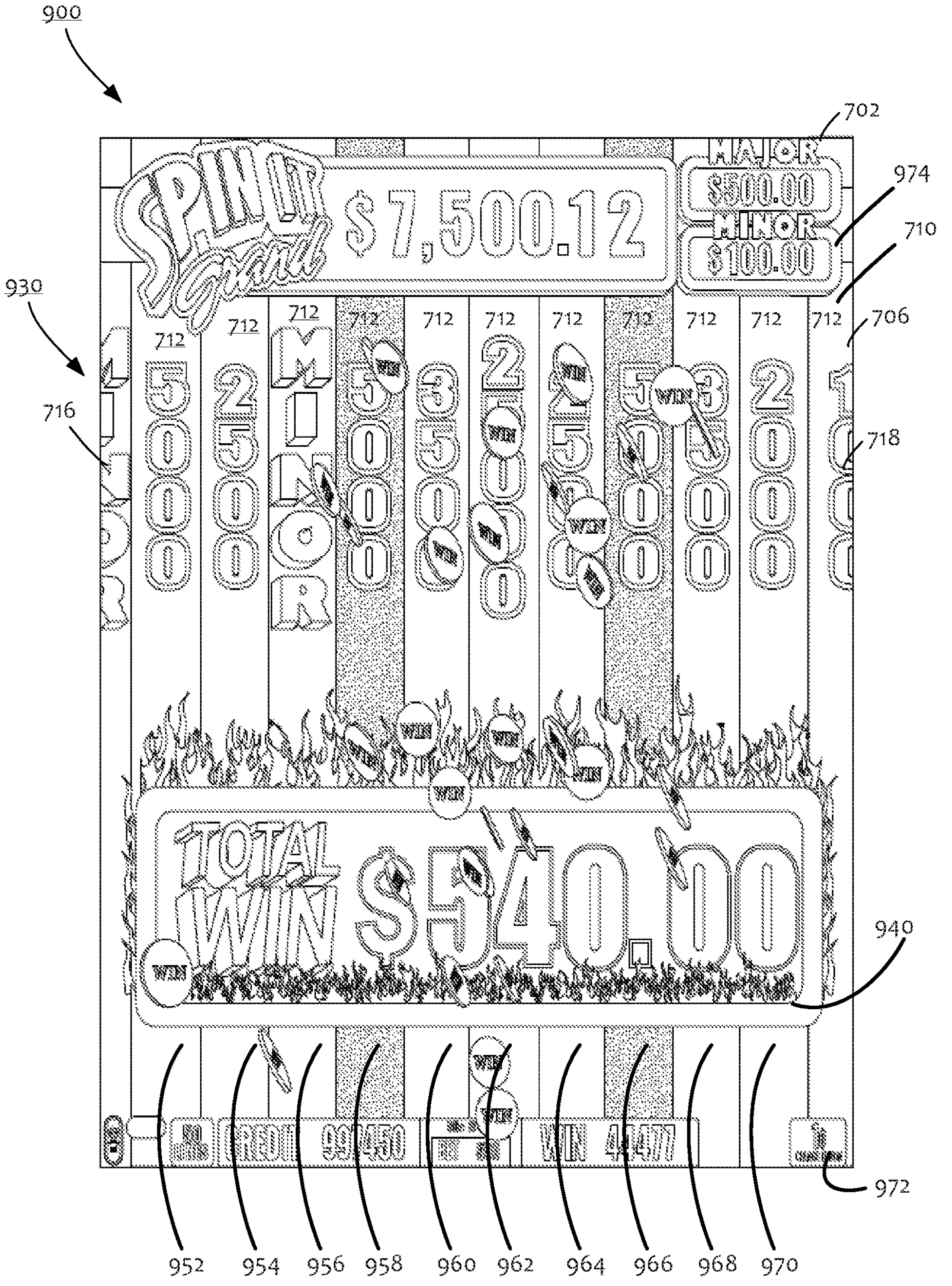
FIG. 9C illustrates a completion of the feature game 900 of FIG. 9B.

FIG. 9C illustrates a completion 930 of the feature game 900 of FIG. 9B. That is, a series of spins has been completed. The completion 930 shows that the vertical segments 712 align with the tubes 952, 954, 956, 958, 960, 962, 964, 966, 968, 970. The award controller 625*h* then awards a feature prize based on the prize identifiers that aligned with tubes 952, 954, 956, 960, 962, 964, 968, 970. The completion 930 also shows the feature prize in a pop-up feature prize window 940.

Figure 10:
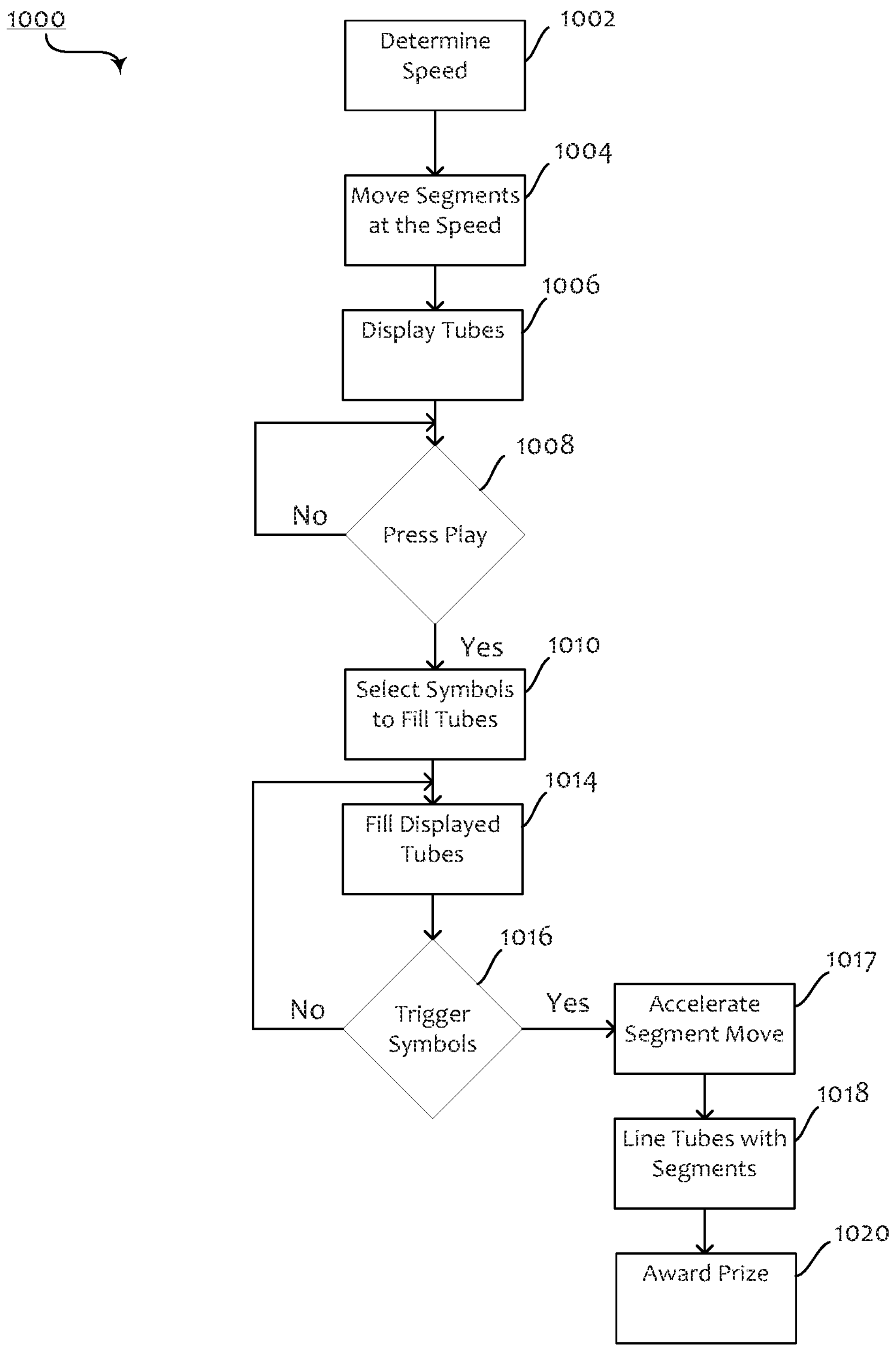
FIG. 10 illustrates a flow chart of an exemplary feature game.

FIG. 10 illustrates a flow chart of an exemplary feature game 1000. The feature game 1000 begins with determining a first feature speed at which the spinning wheel 710 of vertical segments 712 with prize identifiers 714 are moved at block 1002. Generally, the first feature speed is higher than the first speed of the base game 700. The display controller 621 causes the second display area 706 to laterally move the vertical segments at the first feature speed, at block 1004. At block 1006, the feature controller 625*i* (of FIG. 6) causes the first display area 704 to display the plurality of empty tubes 952, 954, 956, 958, 960, 962, 964, 966, 968, 970. Thus, with a denomination 972 of 1¢, the award controller awards a total of 44,000 credits, or $440, and $100 for a MINOR jackpot prize 974 of $100, thus resulting in a total award of $540. In other words, from left to right 5000 ($50)+2500 ($25)+MINOR ($100)+3500 ($35)+25000 ($250)+2500 ($25)+3500 ($35)+2000 ($20)=$540.

When a player actuates the game play mechanism 56 as determined at block 1008, the feature game 1000 proceeds to select symbols, at block 1010, to fill the empty tubes 952, 954, 956, 958, 960, 962, 964, 966, 968, 970 via the symbol selecting controller 625*d*. Although not shown, in some embodiments, the feature controller 625*i* randomly selects which of the tubes 952, 954, 956, 958, 960, 962, 964, 966, 968, 970 to fill. At block 1014, the feature controller 625*i* fills the selected tubes 952, 954, 956, 960, 962, 964, 968, 970 with the selected symbols. The trigger controller 625*e* then determines whether the filled tubes include predetermined symbols at block 1016. In some embodiments, only tubes 952, 954, 956, 960, 962, 964, 968, 970 are filled with predetermined symbols 918.

When the trigger controller 625*e* determines that the filled tubes include predetermined symbols at block 1016, the speed controller 625*c* accelerates the lateral movements of the vertical segments 712 at block 1017. At block 108, the speed controller 625*c* effectively slows down the spinning wheel to align the vertical segments 712 with the tubes 952, 954, 956, 958, 960, 962, 964, 966, 968, 970. At block 1020, the award controller 625*h* then awards the player with the prize identifiers 714 that are aligned with the filled tubes 952, 954, 956, 960, 962, 964, 968, 970.

Further aspects of the method will be apparent from the above description of the system. It will be appreciated that at least part of the method will be implemented electronically, for example, digitally by a processor executing program code such as in the above description of a game controller. In this respect, in the above description certain steps are described as being carried out by a processor of a gaming system, it will be appreciated that such steps will often require a number of sub-steps to be carried out for the steps to be implemented electronically, for example due to hardware or programming limitations. For example, to carry out a step such as evaluating, determining or selecting, a processor may need to compute several values and compare those values.

As indicated above, the method may be embodied in program code. The program code could be supplied in a number of ways, for example on a tangible computer readable storage medium, such as a disc or a memory device, e.g. an EEPROM, (for example, that could replace part of memory 103) or as a data signal (for example, by transmitting it from a server). Further different parts of the program code can be executed by different devices, for example in a client server relationship. Persons skilled in the art will appreciate that program code provides a series of instructions executable by the processor.

It will be understood to persons skilled in the art of the invention that many modifications may be made without departing from the spirit and scope of the invention. In particular, it will be apparent that certain features of embodiments of the invention can be employed to form further embodiments.

It is to be understood that, if any prior art is referred to herein, such reference does not constitute an admission that the prior art forms a part of the common general knowledge in the art in any country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A gaming machine for play of a base game and a feature game, the gaming machine comprising:

a credit input device operable to receive a physical item representing a monetary value to establish a credit balance, the credit balance being increasable and decreasable;

a display device operable to present the base game, the feature game, and a plurality of vertical segments that are displayed during the base game and the feature game, the base game having a plurality of different base game symbol outcomes, the feature game being triggerable by at least one of the plurality of different base game symbol outcomes, and one or more of the plurality of vertical segments comprising a carried number visible from the display device; and a game controller comprising a processor and memory, the memory storing instructions, which, when executed, cause the game controller to at least, during play the base game:

move the plurality of vertical segments laterally across the display device;

select a first vertical segment of the plurality of vertical segments for a numerical upgrade in response to one of the plurality of different base game symbol outcomes; and control the display device to visually present the numerical upgrade of the first vertical segment by displaying the carried number of the first vertical segment being numerically increased from an initial value to a final value in increments that result in a plurality of intermediate values being displayed by the first vertical segment; and during play of the feature game:

select a second vertical segment of the plurality of vertical segments; and after selection of the second vertical segment, control the display device to display an increase of the credit balance based on the carried number of the second vertical segment.

2. The gaming machine according to claim 1, wherein executing the instructions further causes the game controller to randomly select the first vertical segment from the plurality of vertical segments.

3. The gaming machine according to claim 1, wherein executing the instructions further causes the game controller to control the display device to visually present the numerical upgrade of the first vertical segment while laterally moving the first vertical segment across the display device.

4. The gaming machine according to claim 1, wherein executing the instructions further causes the game controller to control the display device to show the first vertical segment moving laterally across the display device at a first speed.

5. The gaming machine according to claim 4, wherein executing the instructions further causes the game controller to:

control the display device to show the numerical upgrade of the first vertical segment while laterally moving the first vertical segment across the display device at a second speed different from the first speed; and select the second speed such that the numerical upgrade of the first vertical segment from the initial value to the final value completes before the first vertical segment moves out of the display device.

6. The gaming machine according to claim 1, wherein executing the instructions further causes the game controller to control a rate at which the carried number of the first vertical segment is increased from the initial value to the final value on the display device such that the numerical upgrade of the first vertical segment completes before the first vertical segment moves out of the display device.

7. The gaming machine according to claim 1, wherein a width of the plurality of vertical segments is greater than a width of a plurality of reels that display the plurality of different base game symbol outcomes.

8. A gaming machine, comprising:

a credit input device operable to receive a physical item representing a monetary value to establish a credit balance, the credit balance being increasable and decreasable;

a display device; and a game controller comprising a processor and memory, the memory storing a plurality of symbols and instructions, which, when executed, cause the game controller to at least:

control the display device to display a plurality of segments carrying a plurality of prize identifiers;

control the display device to move the plurality of segments visually at a first speed;

select symbols from the memory for display;

control the display device to display the selected symbols;

select a first segment from the plurality of segments to be upgraded in response to determining, based on the selected symbols, that a trigger condition has occurred;

control the display device to move the first segment visually at a second speed;

upgrade a first prize identifier of the first segment by increasing the first prize identifier from an initial value to a final value in increments that result in a plurality of intermediate values being displayed by the first segment;

after upgrading the first segment, select a winning segment from the plurality of segments; and after selection of the winning segment, control the display device to display an increase of the credit balance based on a prize identifier of the winning segment.

9. The gaming machine according to claim 8, wherein executing the instructions further causes the game controller to randomly select the first segment from the plurality of segments.

10. The gaming machine according to claim 8, wherein executing the instructions further causes the game controller to upgrade the first prize identifier while moving the first segment visually at the second speed.

11. The gaming machine according to claim 8, wherein executing the instructions further causes the game controller to visually move the first segment at a third speed that is different from the second speed after upgrading the first prize identifier of the first segment.

12. The gaming machine according to claim 8, wherein executing the instructions further causes the game controller to determine an amount of upgrade to the first prize identifier.

13. The gaming machine according to claim 12, wherein executing the instructions further causes the game controller to determine the second speed based on the amount of upgrade.

14. The gaming machine according to claim 8, wherein executing the instructions further causes the game controller to:

determine if the first segment is displayed before upgrading the first prize identifier; and in response to determining that the first segment is not displayed before the upgrading, increase a movement speed of the plurality of segments to hasten display of the first segment.

15. The gaming machine according to claim 8, wherein executing the instructions further causes the game controller to finish upgrading the first prize identifier before the first segment moves out of the display device.

16. The gaming machine according to claim 8, wherein a width of the plurality of segments is greater than a width of a plurality of reels that display the selected symbols.

17. The gaming machine according to claim 8, wherein:

the plurality of segments include a plurality of vertical segments; and executing the instructions further causes the game controller to move the plurality of vertical segments visually and laterally into and out of a display area of the display device.

18. A gaming machine comprising:

a credit input device operable to receive a physical item representing a monetary value to establish a credit balance, the credit balance being increasable and decreasable;

a display device having a plurality of display positions; and a game controller comprising a processor and memory, the memory storing a plurality of symbols, a plurality of prize identifiers, and instructions, which, when executed, cause the game controller to at least:

select symbols from the memory;

control the display device to display the selected symbols at the plurality of display positions;

control the display device to move a plurality of prize segments visually across the display device at a first speed, each prize segment being associated with a prize identifier of the plurality of prize identifiers;

determine if the selected symbols correspond to a trigger condition;

select a first prize identifier to upgrade in response to determining that the selected symbols correspond to the trigger condition;

control the display device to visually move the plurality of prize segments at a second speed across the display device to display the first prize identifier selected to be upgraded; and complete an upgrade of the first prize identifier by increasing an initial value of the first prize identifier to a final value such that a plurality of intermediate values of the first prize identifier are displayed by the display device;

after completion of the upgrade of the first prize identifier, select one or more winning prize segments from the plurality of prize segments; and after selection of the one or more winning prize segments, control the display device to display an increase of the credit balance based on prize identifiers of the one or more winning prize segments.

19. The gaming machine according to claim 18, wherein executing the instructions further causes the game controller to randomly select the first prize identifier from the plurality of prize identifiers.

20. The gaming machine according to claim 18, wherein executing the instructions further causes the game controller to control the display device to upgrade the first prize identifier while moving at the second speed.

21. The gaming machine according to claim 18, wherein executing the instructions further causes the game controller to control the display device to visually move the first prize identifier at the second speed that is different from the first speed.

22. The gaming machine according to claim 18, wherein executing the instructions further causes the game controller to determine an amount of upgrade to the first prize identifier.

23. The gaming machine according to claim 22, wherein executing the instructions further causes the game controller to determine the second speed based on the amount of upgrade.

24. The gaming machine according to claim 18, wherein executing the instructions further causes the game controller to:

determine if the first prize identifier is displayed before upgrading the first prize identifier; and in response to determining that the first prize identifier is not displayed before the upgrading, increase a movement speed of the plurality of prize identifiers to hasten display of the first prize identifier.

25. The gaming machine according to claim 18, wherein executing the instructions further causes the game controller to control the display device to complete an upgrade of the first prize identifier before the first prize identifier moves out of view on the display device.

26. The gaming machine according to claim 18, wherein:

the plurality of prize segments include a plurality of vertical segments; and executing the instructions further causes the game controller to control the display device to move the plurality of vertical segments laterally across the display device.

27. The gaming machine according to claim 18, wherein a width of the plurality of segments is greater than a width of a plurality of reels that display the selected symbols at the plurality display positions.

* * * * *